(12) United States Patent
Loncar et al.

(10) Patent No.: US 11,092,873 B1
(45) Date of Patent: Aug. 17, 2021

(54) RECONFIGURABLE ELECTRO-OPTIC FREQUENCY SHIFTERS

(71) Applicant: President and Fellows of Harvard College, Cambridge, MA (US)

(72) Inventors: Marko Loncar, Cambridge, MA (US); Yaowen Hu, Cambridge, MA (US); Mian Zhang, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 16/999,769

(22) Filed: Aug. 21, 2020

(51) Int. Cl.
*G02F 1/35* (2006.01)
*G02F 1/355* (2006.01)
*G02F 1/365* (2006.01)

(52) U.S. Cl.
CPC ............ *G02F 1/353* (2013.01); *G02F 1/3501* (2013.01); *G02F 1/3551* (2013.01); *G02F 1/365* (2013.01);
(Continued)

(58) Field of Classification Search
CPC ...... G02F 1/3501; G02F 1/3503; G02F 1/353; G02F 1/3551; G02F 1/365; G02F 2202/20; G02F 2203/15
See application file for complete search history.

(56) References Cited

U.S. PATENT DOCUMENTS

| 4,904,038 A | * | 2/1990 | Chang | ...................... G02B 6/10 350/96.14 |
| 5,542,009 A | * | 7/1996 | Kuehnle | ................ G02B 1/335 385/7 |

(Continued)

FOREIGN PATENT DOCUMENTS

WO     WO-2019/213140 A1     11/2019

OTHER PUBLICATIONS

Ehrlichman et al., "Dual-cavity optically and electrically resonant modulators for efficient narrowband RF/microwave photonics," CLEO 1-2 (2017).
(Continued)

*Primary Examiner* — Daniel Petkovsek
(74) *Attorney, Agent, or Firm* — Erik Huestis; Alexander Akhiezer; Foley Hoag LLP

(57) ABSTRACT

Reconfigurable electro-optic frequency shifters are provided. In various embodiments, the optical frequency shifter comprises a continuous optical spectrum medium; a discrete optical spectrum medium optically coupled to the continuous optical spectrum medium; and a tunable element operably coupled to the discrete optical spectrum medium, wherein: the discrete optical spectrum medium has N optical modes (I:$\{i_1 \ldots i_N\}$), said optical modes being ordered and equidistant in a frequency domain, wherein N is an integer equal to or greater than 3, each of the optical modes ($i_n \in I$) having a coupling constant $\kappa_{e,n}$ with respect to the continuous optical spectrum medium, wherein at least one of the coupling constants $\kappa_{e,n}$ is different from the other coupling constants, the optical modes (I) having a coupling constant $\Omega$ with respect to one another, wherein the tunable element is configured to control the coupling constant $\Omega$.

22 Claims, 24 Drawing Sheets

(52) U.S. Cl.
CPC ........ *G02F 1/3503* (2021.01); *G02F 2202/20* (2013.01); *G02F 2203/15* (2013.01)

(56) References Cited

U.S. PATENT DOCUMENTS

| | | | | |
|---|---|---|---|---|
| 8,538,270 | B2* | 9/2013 | Seidel .................... | G02F 2/002 |
| | | | | 398/140 |
| 8,625,936 | B1* | 1/2014 | Dong .................... | G02F 1/2257 |
| | | | | 385/3 |
| 9,787,405 | B2* | 10/2017 | Baehr-Jones ......... | G02F 1/3132 |
| 2018/0031946 | A1 | 2/2018 | Middlebrook et al. | |

OTHER PUBLICATIONS

International Search Report and Written Opinion for International Application No. PCT/US2019/030008 dated Sep. 2, 2019.

Soltani et al., "Efficient quantum microwave-to-optical conversion using electro-optic nanophotonic coupled-resonators," ARVIX.org 1-10 (2017).

Wade et al., "Wavelength conversion in modulated coupled-resonator systems and their design via an equivalent linear filter representation," Optics Letters, 40(1):107-110 (2015).

Yu et al., "Silicon dual-ring modulator driven by differential signal," Optics Letts 39(22):6379-6382 (2014).

\* cited by examiner

US 11,092,873 B1

RECONFIGURABLE ELECTRO-OPTIC FREQUENCY SHIFTERS

STATEMENT REGARDING FEDERALLY SPONSORED RESEARCH OR DEVELOPMENT

This invention was made with government support under N00014-15-1-2761 awarded by U.S. Department of Defense Office of Naval Research. The government has certain rights in the invention.

BACKGROUND

Embodiments of the present disclosure relate to electro-optic devices, and more specifically, to reconfigurable electro-optic frequency shifters.

BRIEF SUMMARY

According to embodiments of the present disclosure, optical frequency shifters are provided. In various embodiments, the optical frequency shifter comprises a continuous optical spectrum medium; a discrete optical spectrum medium optically coupled to the continuous optical spectrum medium; and a tunable element operably coupled to the discrete optical spectrum medium, wherein: the discrete optical spectrum medium has N optical modes (I:$\{i_1 \ldots i_N\}$), said optical modes being ordered and equidistant in a frequency domain, wherein N is an integer equal to or greater than 3, each of the optical modes ($i_n \in I$) having a coupling constant $\kappa_{e,n}$ with respect to the continuous optical spectrum medium, wherein at least one of the coupling constants $\kappa_{e,n}$ is different from the other coupling constants, the optical modes (I) having a coupling constant $\Omega$ with respect to one another, wherein the tunable element is configured to control the coupling constant $\Omega$.

According to embodiments of the present disclosure, optical frequency shifters are provided. In various embodiments, the optical frequency shifter comprises: a waveguide; a first ring resonator optically coupled to the waveguide, the first ring resonator having a first plurality of optical modes; a racetrack resonator optically coupled to the first ring resonator, the racetrack resonator having N optical modes (I:$\{i_1 \ldots i_N\}$), said optical modes being ordered and equidistant in a frequency domain, wherein N is an integer equal to or greater than 3, wherein at least two optical modes of the second resonator each is coupled to an optical mode of the first optical resonator, so that not all optical modes (I) are coupled to the optical modes of the first ring resonator; a third ring resonator optically coupled to the racetrack resonator, the second ring resonator having a second plurality of optical modes, wherein at least two optical modes of the third resonator each is coupled to an optical mode of the racetrack resonator, so that so that not all optical modes (I) are coupled to the optical modes of the third ring resonator, and further wherein at least one optical mode ($i_j \in I$; $2 \leq j \leq N$) is uncoupled from its immediately preceding mode ($i_{j-1}$) and at least one optical mode ($i_k \in I$; $1 \leq k \leq N-1$) is uncoupled from its immediate succeeding mode ($i_{k+1}$); the optical frequency shifter further comprising: a tunable microwave (MW) source, the MW source configured to generate a waveform signal having a MW frequency, the MW frequency being tunable within a frequency band that includes a difference between the optical modes (I) in the frequency domain; a pair of electrodes disposed within the racetrack resonator, wherein the tunable MW source is electrically coupled to the pair of electrodes.

According to embodiments of the present disclosure, methods of shifting an optical frequency of a continuous wave are provided. In various embodiments, the method comprises: receiving a continuous wave (CW) of a first optical frequency in a continuous optical spectrum medium; causing the CW of the first optical frequency to propagate from the continuous optical spectrum medium to a discrete optical spectrum medium, wherein: the discrete optical spectrum medium has N optical modes (I:$\{i_1 \ldots i_N\}$), said optical modes being ordered and equidistant in a frequency domain, wherein N is an integer equal to or greater than 3, each of the optical modes ($i_n \in I$) having a coupling constant $\kappa_{e,n}$ with respect to the continuous optical spectrum medium, wherein at least one of the coupling constants $\kappa_{e,n}$ is different from the other coupling constants, the optical modes (I) having a coupling constant $\Omega$ with respect to one another, modulating the coupling constant $\Omega$, thereby generating a CW of a second optical frequency; and causing the CW of the second optical frequency to propagate from the discrete optical spectrum medium into the continuous optical spectrum medium.

According to embodiments of the present disclosure, methods of shifting an optical frequency of a continuous wave are provided. In various embodiments, the method comprises receiving a continuous wave (CW) of a first optical frequency in a waveguide; causing the CW of the first optical frequency to propagate from the waveguide to a first ring resonator optically coupled to the waveguide, the first ring resonator the first ring resonator having a first plurality of optical modes; causing the a racetrack resonator to be optically coupled to the first ring resonator, the racetrack resonator having N optical modes (I:$\{i_1 \ldots i_N\}$), said optical modes being ordered and equidistant in a frequency domain, wherein N is an integer equal to or greater than 3, and wherein at least two optical modes of the second resonator each is coupled to an optical mode of the first optical resonator, so that not all optical modes (I) are coupled to the optical modes of the first ring resonator; causing a third ring resonator to be optically coupled to the racetrack resonator, the second ring resonator having a second plurality of optical modes, wherein at least two optical modes of the third resonator each is coupled to an optical mode of the racetrack resonator, so that so that not all optical modes (I) are coupled to the optical modes of the third ring resonator, and further wherein at least one optical mode ($i_j \in I$; $2 \leq j \leq N$) is uncoupled from its immediately preceding mode ($i_{j-1}$) and at least one optical mode ($i_k \in I$; $1 \leq k \leq N-1$) is uncoupled from its immediate succeeding mode ($i_{k+i}$); causing a tunable microwave (MW) source to generate a MW waveform signal having a MW frequency, the MW frequency being tunable within a frequency band that includes a difference between the optical modes (I) in the frequency domain; the MW waveform signal driving pair of electrodes disposed within the racetrack resonator, wherein the tunable MW source is electrically coupled to the pair of electrodes; thereby generating a CW of a second optical frequency; and causing the CW of the second optical frequency to propagate from the first ring resonator into the waveguide.

DETAILED DESCRIPTION

Figure 1A:
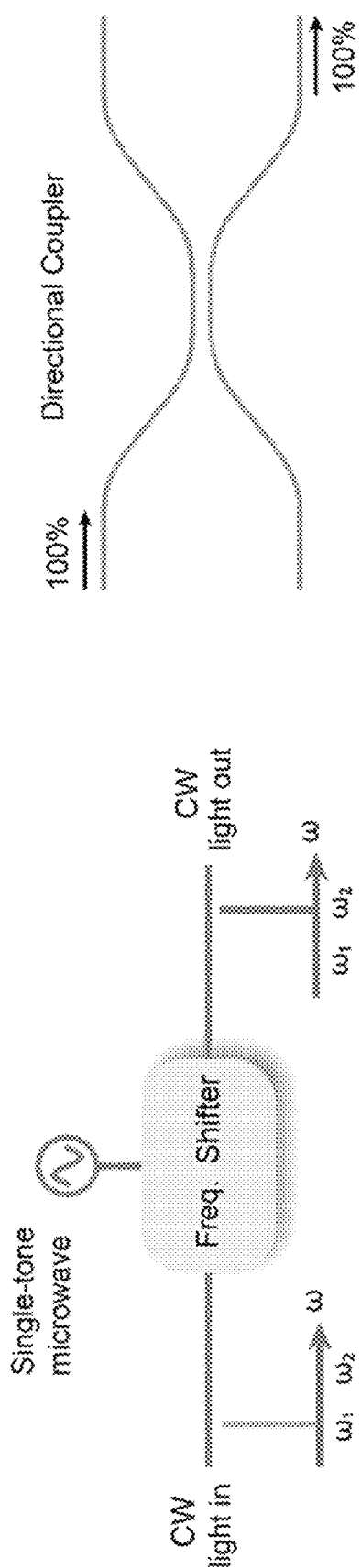
FIG. 1A is a schematic view of a frequency shifter and analogous directional coupler according to embodiments of the present disclosure.

Efficient and precise control of the frequency of light on gigahertz scales is useful in a wide range of applications. Examples include frequency shifting for atomic physics experiments, single-sideband modulation for microwave photonics applications, channel switching and swapping in optical communication systems, and frequency shifting and beam splitting for frequency domain photonic quantum computing. However, realizing GHz-scale frequency shifts with high efficiency, low loss and reconfigurability, in particular using a miniature and scalable device, is challenging since it requires efficient and controllable nonlinear optical processes.

Approaches based on acousto-optics, all-optical wave mixing, and electro-optics are either limited to low efficiencies or frequencies, or are bulky, and do not simultaneously demonstrate the required properties mentioned above. The present disclosure provides on-chip electro-optic frequency shifters that are precisely controlled using only a single-tone microwave signal. This is accomplished by engineering the density of states of, and coupling between, optical modes in ultra-low loss electro-optic waveguides and resonators realized in lithium niobate nanophotonics.

Devices according to the present disclosure provide frequency shifts as high as 28 GHz with measured shift efficiencies of ~99% and insertion loss of <0.5 dB. Such devices can be reconfigured as a tunable frequency-domain beam splitter, in which the splitting ratio and splitting frequency are controlled by microwave power and frequency, respectively. Using the device, non-blocking frequency routing is demonstrated through an efficient exchange of information between two distinct frequency channels (swap operation). This scheme can be scaled to achieve cascaded frequency shifts beyond 100 GHz. These devices are useful as a building-block for high-speed and large-scale classical information processors as well as frequency-domain photonic quantum computers.

The progress of photonic science and technology is intimately related to the ability to utilize and precisely control all fundamental degrees of freedom of a photon. While, for example, photon position (path) and polarization can be readily controlled using elementary optical components such as beam splitters and waveplates, frequency control is more challenging as it requires changing the energy of a photon. Alternative devices for frequency control of light include those based on acousto-optics, all-optical wave-mixing, and electro-optics (EO). Acousto-optic modulators use phonon scattering to control photon energy and can shift the frequency of light in the kHz to few GHz range. However, they demonstrate high-efficiency only in bulk structures that are not compatible with photonic integration. All-optical wave-mixing can achieve efficient frequency conversion in the THz range in bulk media. However, it requires stringent phase matching conditions, can suffer from parasitic nonlinear processes, and is difficult to control due to a nonlinear dependence on optical power.

The EO effect directly mixes microwave and optical fields and can be used to achieve frequency control of light. However, EO modulators produce undesired symmetric sidebands and are thus unable to achieve efficient frequency shifts. A number of methods may be used to address this problem. Serrodyne modulation uses a saw-tooth waveform to generate unidirectional frequency shifts, but extending this method to the GHz regime requires broadband and high-power electronics, which ultimately limits its practical usage. In-phase and quadrature (IQ) modulators can eliminate symmetric sidebands via destructive interference among multiple modulators, but they are fundamentally limited by biasing-induced insertion loss and are accompanied by higher-order sidebands. Other methods such as adiabatic tuning of the optical cavity resonance or spectral shearing, which applies a linear temporal phase to light with sinusoidal modulation, are capable of unidirectional frequency shifting, but they require pulsed operation with a known timing reference. Consequently, a practical and efficient EO device that can shift the frequency of light on-demand is still missing.

The present disclosure overcomes these limitations and provides an on-chip EO frequency shifter that has ~99% shift efficiency and low insertion loss. This is accomplished using only a single monotone microwave source. EO frequency shifters according to the present disclosure act only on selected frequency modes without affecting other frequencies of light. Furthermore, they feature a tunable shift efficiency in the 0%-99% range, that can be controlled by the applied microwave power. At maximum efficiency, the frequency of all inserted photons is shifted to another frequency.

Referring to FIG. 1, the concept of a reconfigurable electro-optic frequency shifter is illustrated. In FIG. 1A, a frequency shifter converts light from one frequency to another, analogous to a directional coupler that changes the path (spatial modes) of a photon. In FIG. 1B, a frequency beam splitter partially converts light from one frequency to another, similar to its spatial-mode counterpart. In FIG. 1C and FIG. 1D, the principle of a generalized critical coupling condition that allows complete transfer of energy between levels vis-a-vis frequency shifting of light is shown. In FIG. 1C, a coherent coupling $\Omega$ causes oscillation of energy between two discrete levels $\omega_1$ and $\omega_2$ (e.g., two cavity modes), and each has a decay rate of $\kappa_i$. In FIG. 1D, frequency shifting by coupling two discrete levels to a continuum is shown. Light is coupled from the continuum to level $\omega_1$ at a rate $\kappa_{e1}$, from level $\omega_1$ to level $\omega_2$ at a rate $\Omega$, and from level $\omega_2$ to the continuum at a rate $\kappa_{e2}$. The critical coupling condition $\kappa_{e1}=\Omega=\kappa_{e2}\gg\kappa_i$ results in a unidirectional flow of energy. In FIG. 1E, a schematic of the device used to implement the generalized critical coupling condition (top), and its frequency-domain representation (bottom) are provided. The coupled-ring system provides a pair of hybrid modes, referred to as symmetric (S) and anti-symmetric (AS). Coupling between them is induced by electro-optic modulation.

At maximum efficiency, an exemplary phase shifter is analogous to a directional coupler (FIG. 1A)—it swaps two modes, but in the frequency rather than the spatial domain. On the other hand, at, e.g., 50% shift efficiency, the device serves as a 50:50 frequency domain beam splitter (FIG. 1B). By changing the power of the microwave signal, the splitting ratio can be controlled, and tunable frequency domain beam splitter can be realized. These operations represent the fundamental functionalities required for controlling the frequency degree of freedom of a photon, in analogy with the control of its polarization and path.

To realize the frequency shifting functionality, a general method is provided to control the flow of light in the frequency domain. Two discrete photonic energy levels are considered (FIG. 1C), which could be two resonances of an optical cavity or a doublet formed by mode anti-crossing. When driven, e.g., using coherent microwave signals and electro-optic effect considered in this work, such a two-level photonic system undergoes Rabi oscillation with rate $\Omega$. As a result, the frequency of light inside such a system oscillates between two levels. To enable an efficient unidirectional frequency shift, a continuum of levels (e.g., optical waveguide) is introduced that couples to both discrete levels. By controlling the coupling rates between different levels the photons can be injected at one discrete level and extracted from the other one (FIG. 1D). Photons of frequency $\omega_1$ are coupled from the continuum into level $\omega_1$ with a rate of $\kappa_{e1}$, while being coupled out of level $\omega_2$ back to the continuum with a rate $\kappa_{e2}$. Assuming that each of the levels has a negligible intrinsic loss rate $\kappa_i\ll\kappa_{e1}, \kappa_{e2}$, complete energy transfer (100% frequency shift) occurs when these three rates of energy exchange are balanced: $\kappa_{e1}=\Omega=\kappa_{e2}$ (see Methods for a detailed discussion on this condition). This is referred to as a generalized critical coupling condition. Otherwise, when the condition is not met, partial energy transfer occurs between the two levels, and some fraction of the photons at frequency $\omega_1$ are coupled back into the continuum. This is used to realize a tunable frequency domain beam splitter. When the critical coupling condition is satisfied, the reverse frequency conversion process will also be in a balanced state: photons injected in the continuum at frequency $\omega_2$ will be converted to $\omega_1$ and out-coupled to the continuum at that frequency.

In an exemplary embodiment, this scheme is implemented using a coupled-cavity structure on thin-film lithium niobate (FIG. 1E), in which coherent coupling of two optical frequency modes is achieved via the EO effect and microwave driving.

Two micro-ring resonators 101, 102 are placed close to each other with a small gap. The two resonators are evanescently coupled through the gap. A coherent microwave signal 103 is applied to both resonators with opposite polarity. Microelectrodes 104, 105 are integrated around the ring resonator to interface microwave signal 103 with the photonic system. The microwave electrodes are positioned on opposite sides of the two rings. An input waveguide 106 is coupled with resonator 101.

Figure 2A:
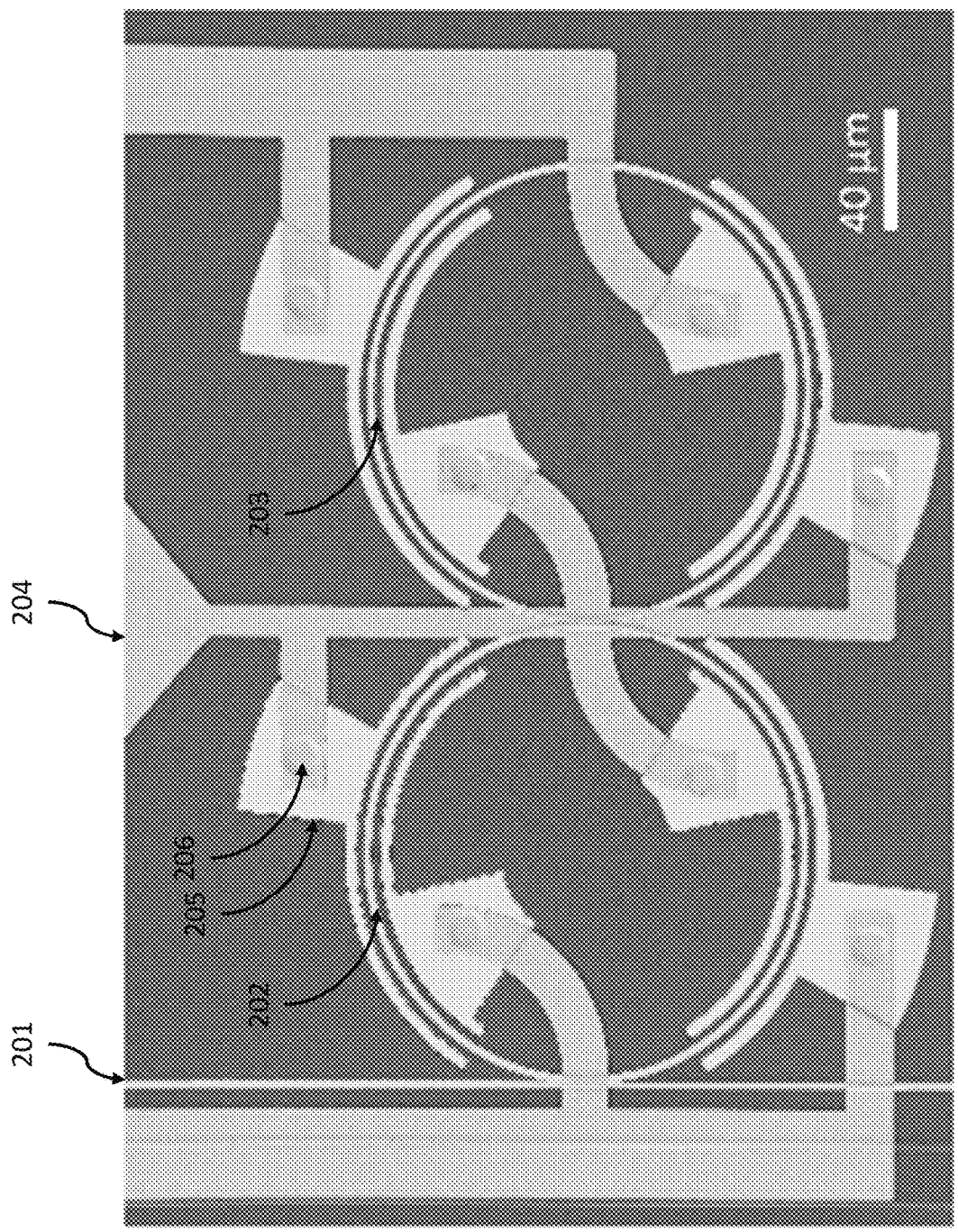
FIG. 2A is a scanning electron microscopy (SEM) micrograph of a frequency shifting device according to embodiments of the present disclosure.
Figure 2B:
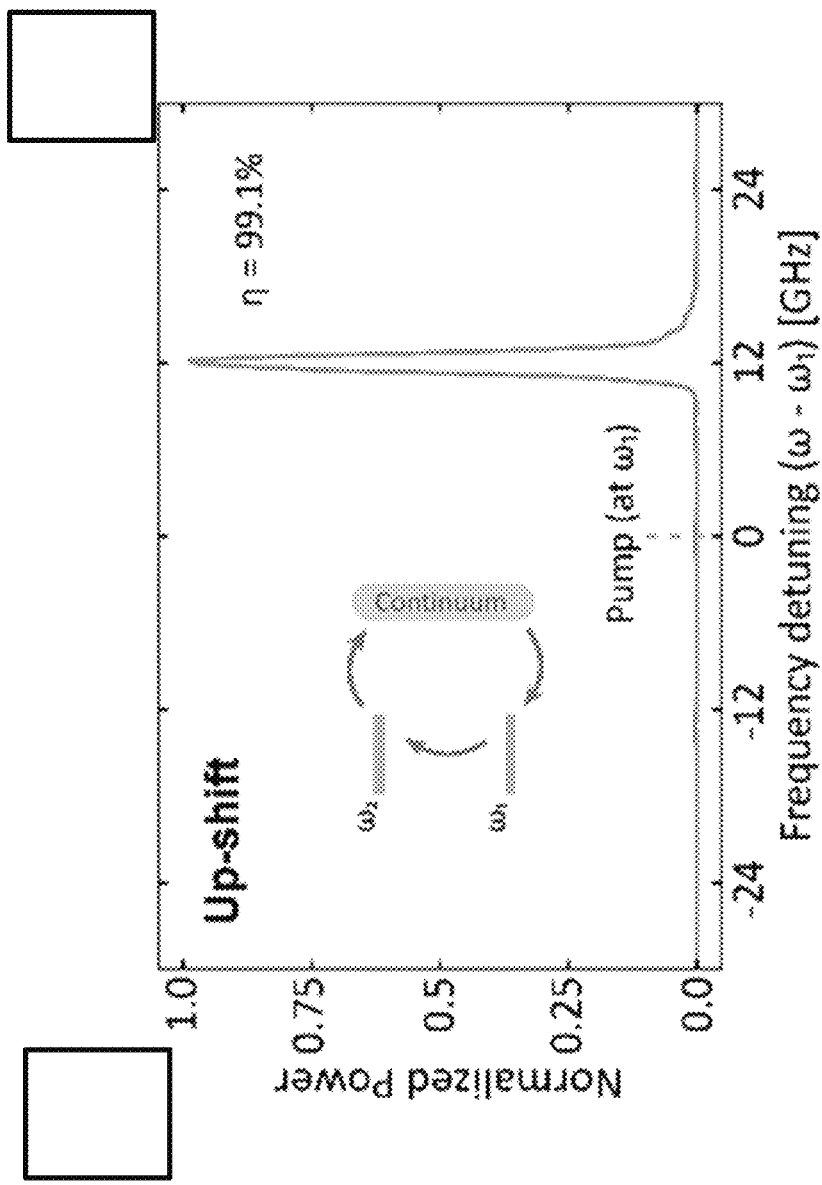
FIGS. 2B-C are plots of normalized power versus frequency detuning, illustrating electro-optic frequency shift according to embodiments of the present disclosure.

Evanescent coupling between two identical ring resonators 101, 102 gives rise to a resonance doublet that corresponds to symmetric (S) and anti-symmetric (AS) modes with frequencies $\omega_1$ and $\omega_2$. A single bus waveguide 106 provides a continuum of modes as well as the input and output ports of the device. The two cavities are efficiently modulated using a single sinusoidal microwave drive 103, and support high frequencies owing to the small capacitance and parasitic inductance of the electrodes (FIG. 2A and Methods). The microwave frequency is either matched or detuned from the frequency difference between the S and AS modes of the doublet, depending on the experiment. The coupling rate $\gamma$ between the waveguide and the cavity is 30 times higher than the intrinsic loss $\kappa_1$ of the cavity, yielding two strongly over-coupled modes with balanced effective mode-waveguide coupling of $\kappa_{e1}=\kappa_{e2}=\gamma/2$ that are needed for the generalized critical coupling condition (see Methods). Specifically, devices are fabricated with various doublet splittings of 11.0, 12.5 and 28.2 GHz at telecommunication wavelengths by changing the gap between the coupled rings.

Referring to FIG. 2, a reconfigurable electro-optic frequency shifter is illustrated. In FIG. 2A, a scanning electron microscopy (SEM) micrograph of the frequency shifting device in false color is shown. Optical waveguide 201 and ring resonators 202, 203 are shown. Metal electrodes have two layers 204, 205, connected by vias 206 through the cladding oxide. Top 204 and bottom 205 electrode layers are represented by light grey and yellow, respectively. The electrodes are designed to minimize parasitic capacitance and inductance to achieve efficient modulation at high microwave frequencies. In FIG. 2B and FIG. 2C, the electro-optic frequency shift is shown. Up- (FIG. 2B) and down- (FIG. 2C) shifts of 12.5 GHz with >99% shift efficiency at telecommunication wavelengths are shown. The insets show the directions of energy flow in the energy-level description of FIG. 1D, a frequency shift with microwave detuning. The efficiency is reduced from near-unity to 79.2% as the microwave frequency is detuned from 11 GHz (equal to the doublet splitting) to 8 GHz. In FIG. 2E, the shift efficiency for varied microwave detuning is provided. The frequency range is limited by the microwave amplifier. In FIG. 2F, the output of a tunable frequency beam splitter is illustrated. Increasing the microwave power (Y-axis, before amplifier) changes the shift efficiency continuously from 0 to near-unity at a shift-frequency of 28.2 GHz, allowing for a frequency beam splitter with a tunable splitting ratio. Inset: output optical spectrum at 50:50 splitting. MW, microwave; Amp, amplification; Norm, normalized.

Figure 2C:
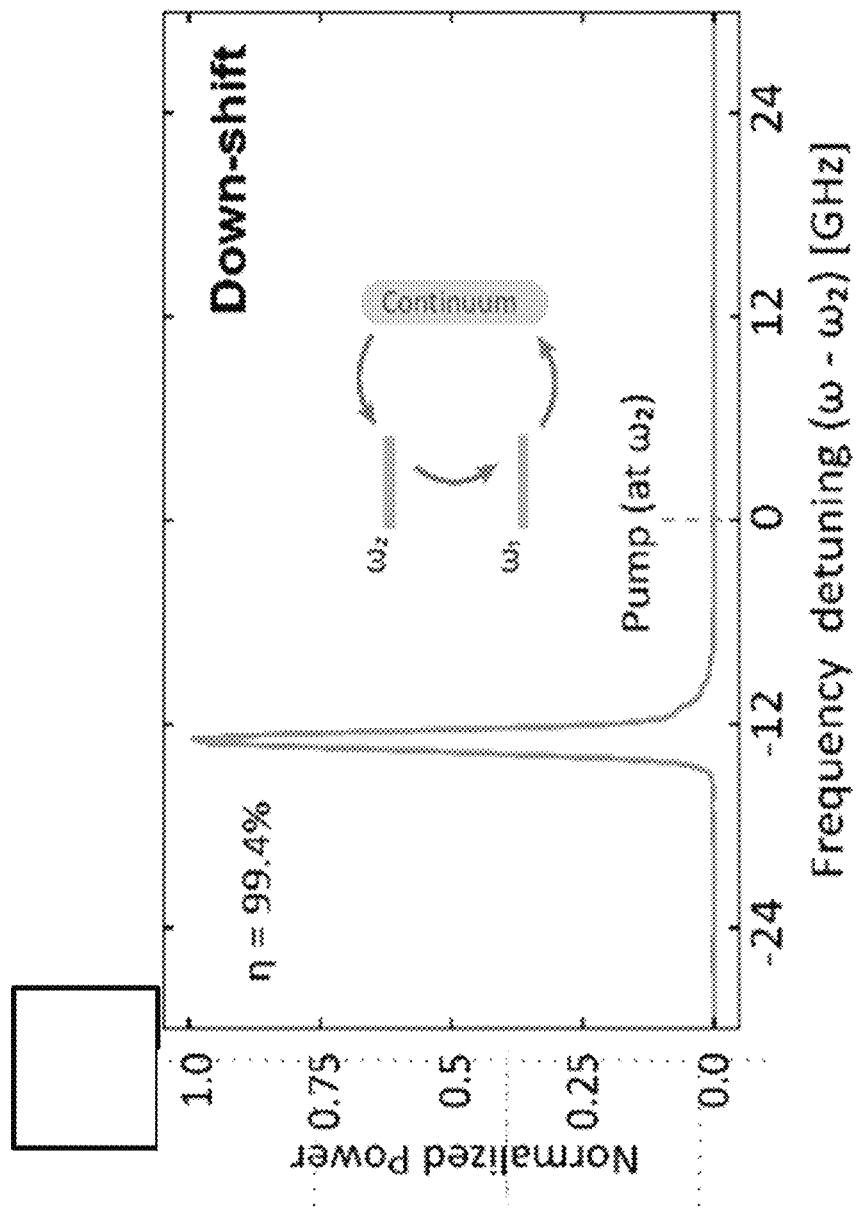

Devices according to the present disclosure are suitable the frequency shifting. Continuous-wave (CW) light of frequency $\omega_1$ (wavelength of 1601.2 nm) and a microwave tone of frequency 12.5 GHz, which matches the splitting of the resonance doublet, are sent to the device. The continuous optical frequency spectrum at the output of the device (FIG. 2B) shows that nearly all the power at frequency $\omega_1$ (S mode) is converted to frequency $\omega_2$ (AS mode), with a measured shift efficiency of 99.1%. This efficiency is defined as the ratio of the optical powers of the shifted frequency and the total light output: $\eta=P_{shift}/P_{out}$. The device also operates in reverse: pumping at frequency $\omega_2$ (AS mode) leads to a down-shift to frequency $\omega_1$ with a measured $\eta=99.4\%$ (FIG. 2C). The device has a low on-chip insertion loss IL of only 1.2 dB (see Methods), defined as the ratio of output and input powers, $IL=P_{out}/P_{in}$. The amount of energy that is transferred to the target frequency is captured by $\eta$, while IL represents the optical loss due to the propagation of light in the device. The absolute on-chip efficiency of the device is therefore $\eta \times IL=P_{shift}/P_{in}$.

Figure 2D:
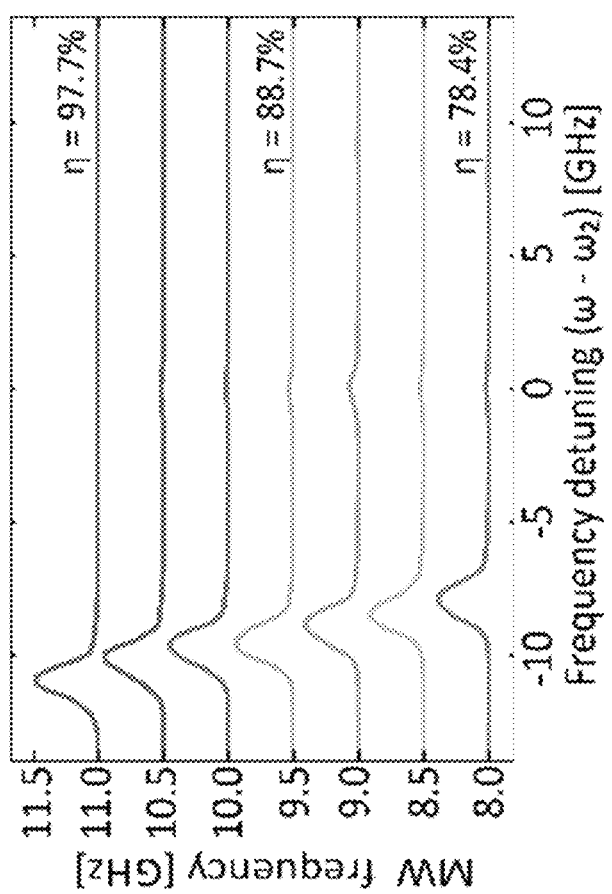
FIG. 2D is a plot of microwave frequency versus frequency detuning, illustrating bandwidth according to embodiments of the present disclosure.
Figure 2E:
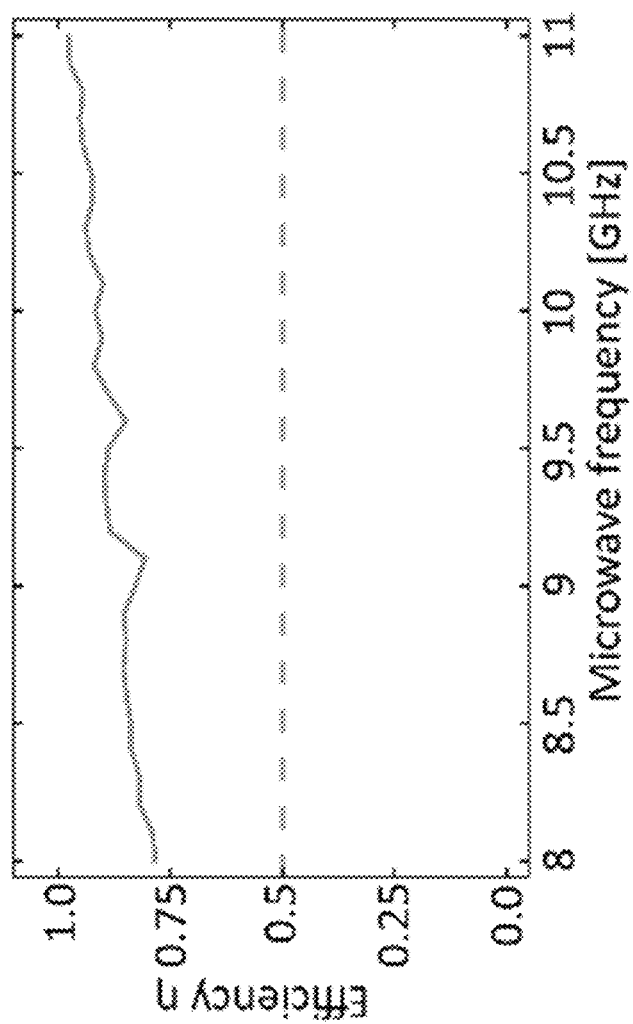
FIG. 2E is a plot of efficiency versus microwave frequency according to embodiments of the present disclosure.

Frequency shifts over a large microwave bandwidth can be achieved by tuning the microwave frequency. Light is injected into the AS mode (at frequency $\omega_2$) of a device with an 11.0 GHz doublet splitting to realize a frequency down-shift. As the microwave frequency is varied from 11.0 GHz to 8.0 GHz, $\eta$ reduces from 97.7% to 78.4%, indicating a 3 dB bandwidth of >3 GHz that is currently limited by the bandwidth of the microwave amplifier (FIG. 2D and FIG. 2E). The bandwidth of the shifter benefits from the strong over-coupling of the optical resonators to the optical waveguide and strong microwave modulation, yielding a bandwidth beyond the cavity linewidth ($2\pi \times 2.8$ GHz, see Methods). One advantage of this approach is that increasing the doublet splitting for larger frequency shift does not degrade $\eta$ or IL, as long as the generalized critical coupling condition is satisfied. This is experimentally confirmed using a 28.2 GHz device with a measured $\eta=98.7\%$ and IL=0.45 dB.

Figure 1B:
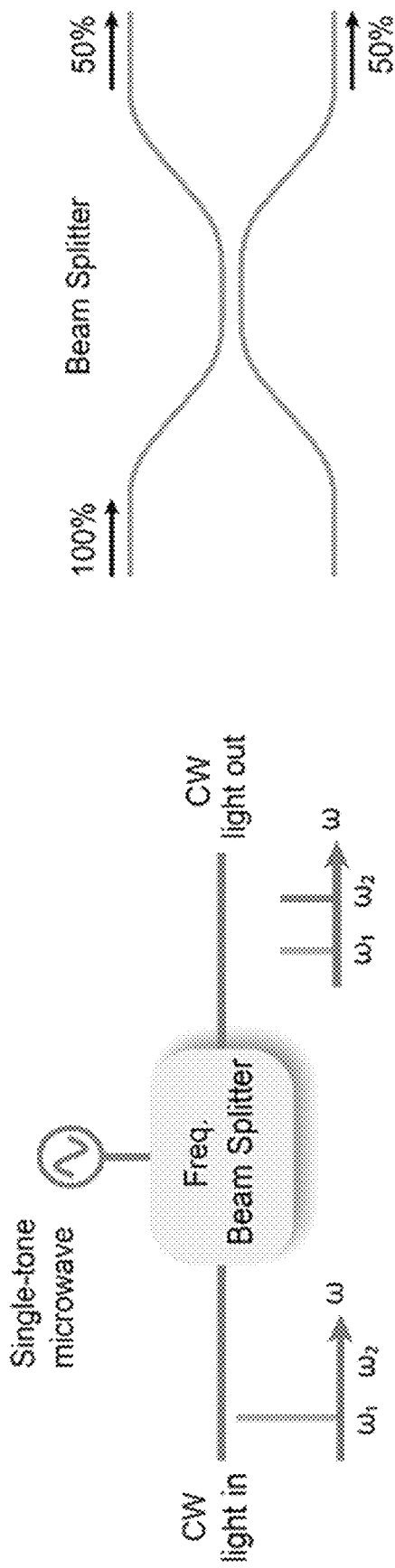
FIG. 1B is a schematic view of a frequency beam splitter and analogous spatial mode beam splitter according to embodiments of the present disclosure.
Figure 1C:
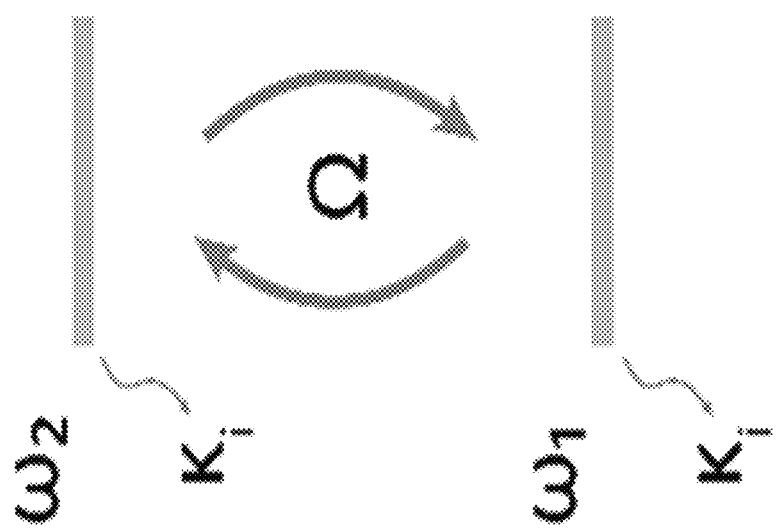
FIGS. 1C-D are schematic diagrams of generalized critical coupling conditions according to embodiments of the present disclosure.
Figure 2F:
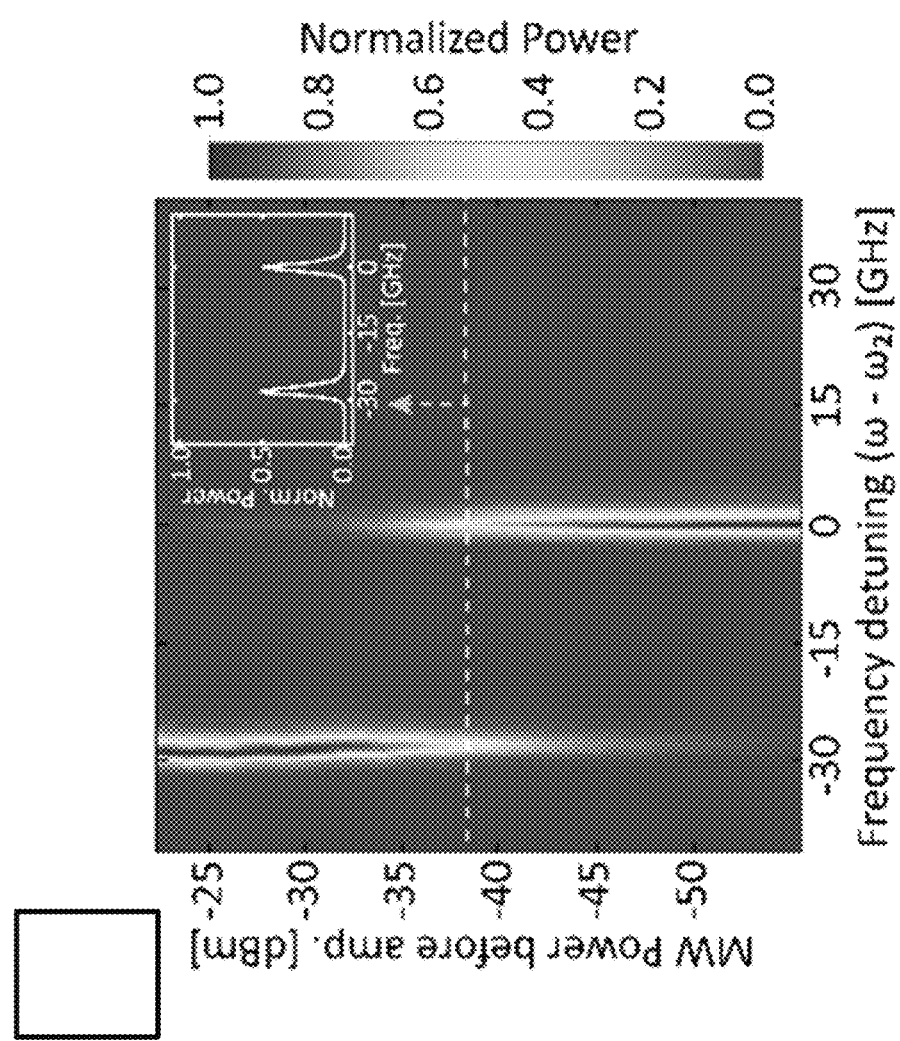
FIG. 2F is a plot of microwave power, frequency detuning, and normalized power according to embodiments of the present disclosure.

Next, the 28.2 GHz device is reconfigured into a frequency beam splitter with a fully tunable power splitting ratio by varying the power of the microwave signal. As the microwave power is increased, $\eta$ of a down-shift continuously increases from 0 to near-unity (FIG. 2F). The case in which optical power is split equally between the two frequency modes $\omega_1$ and $\omega_2$ yields a 50:50 frequency beam splitter (as illustrated in FIG. 1B and with results shown in the inset of FIG. 2F). It should be noted that the frequency splitter, which is based on coherent mixing of optical and microwave fields, performs unitary operations (in the limit of vanishingly small loss) identical to a standard 4-port configuration of a tunable spatial-mode beam splitter (see Methods for theoretical analysis).

Figure 3A:
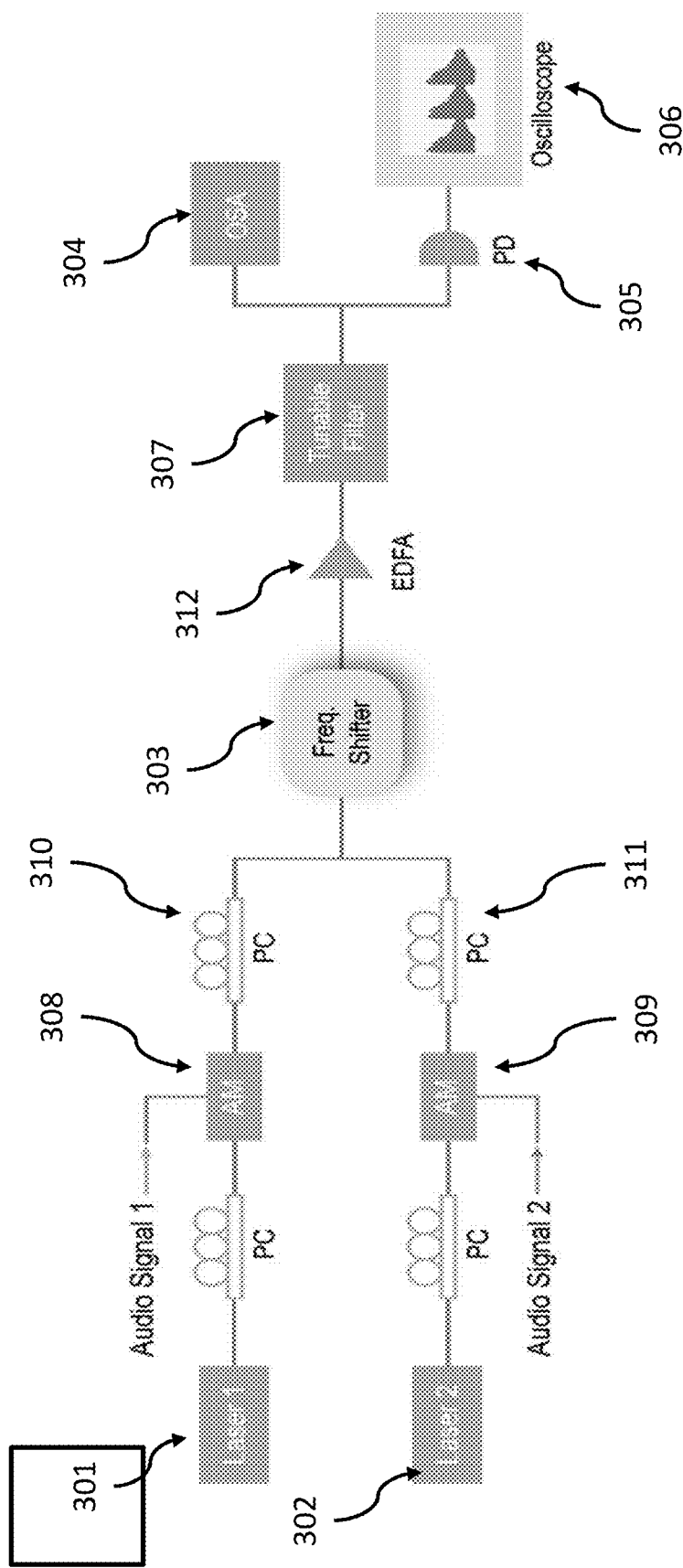
FIG. 3A is a schematic view of an exemplary experimental setup according to embodiments of the present disclosure.
Figure 3B:
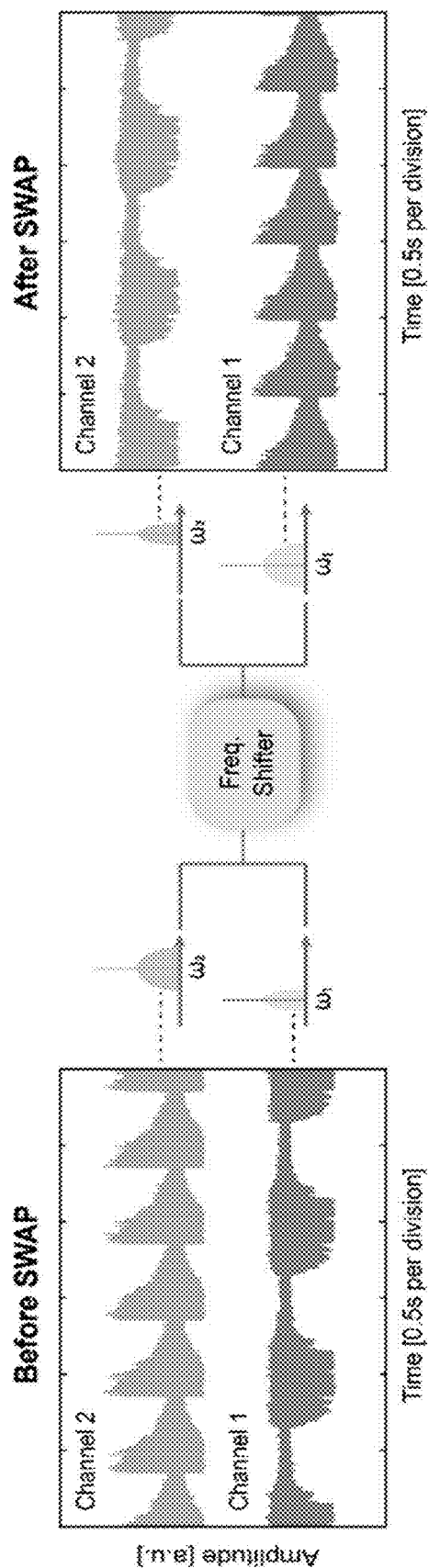
FIG. 3B contains plots of measured audio signals before and after a swap operation according to embodiments of the present disclosure.

Referring to FIG. 3, information swapping between two frequency channels is illustrated. In FIG. 3A, the experimental setup is provided. Laser 301 and 302 emit light of frequency $\omega_1$ and $\omega_2$, respectively, with 11 GHz detuning. The two beams are independently modulated to carry unique audio signals, combined, and then sent to the frequency shifter 303. The output optical spectrum is monitored by an optical spectrum analyzer 304, and each of the frequency channels is measured using a photodetector 305 followed by a real-time oscilloscope 306 after passing a tunable optical filter 307. In the figures, the following abbreviations are used: AM, amplitude modulator 308, 309; PC, polarization controller 310, 311; OSA, optical spectrum analyzer 304; EDFA, erbium-doped fiber amplifier 312; PD, photodetector. In FIG. 3B, the time-domain audio signal in each channel before and after the swapping is shown. The traces represent the audio signal in channel 1 ($\omega_1$) and channel 2 ($\omega_2$), respectively.

Figure 1D:
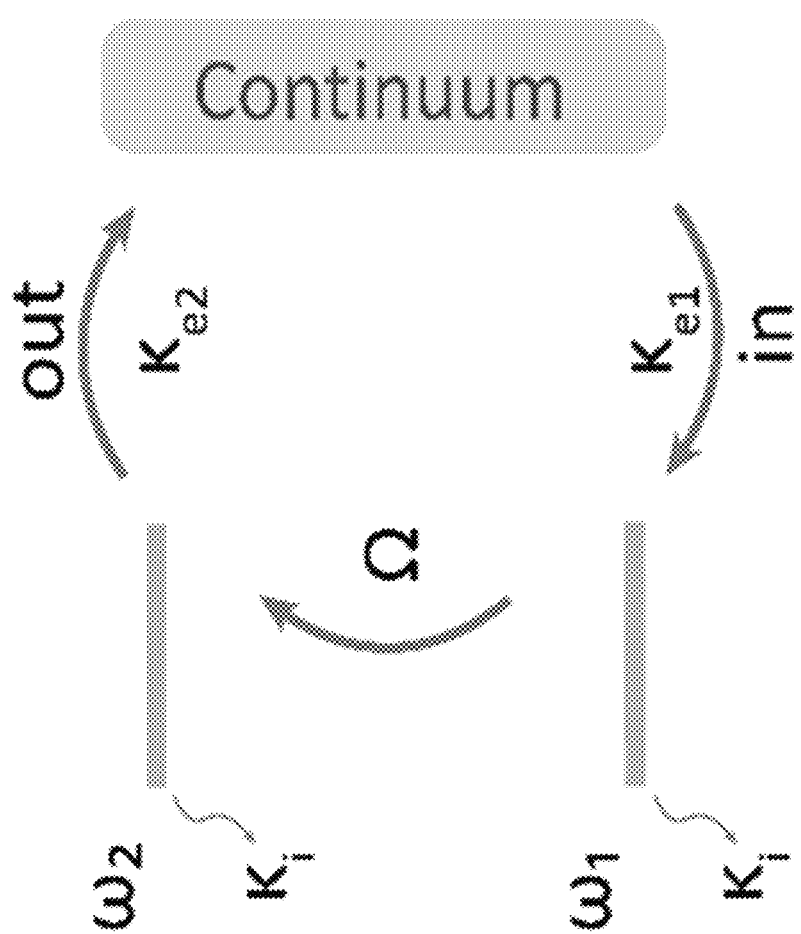
Figure 1E:
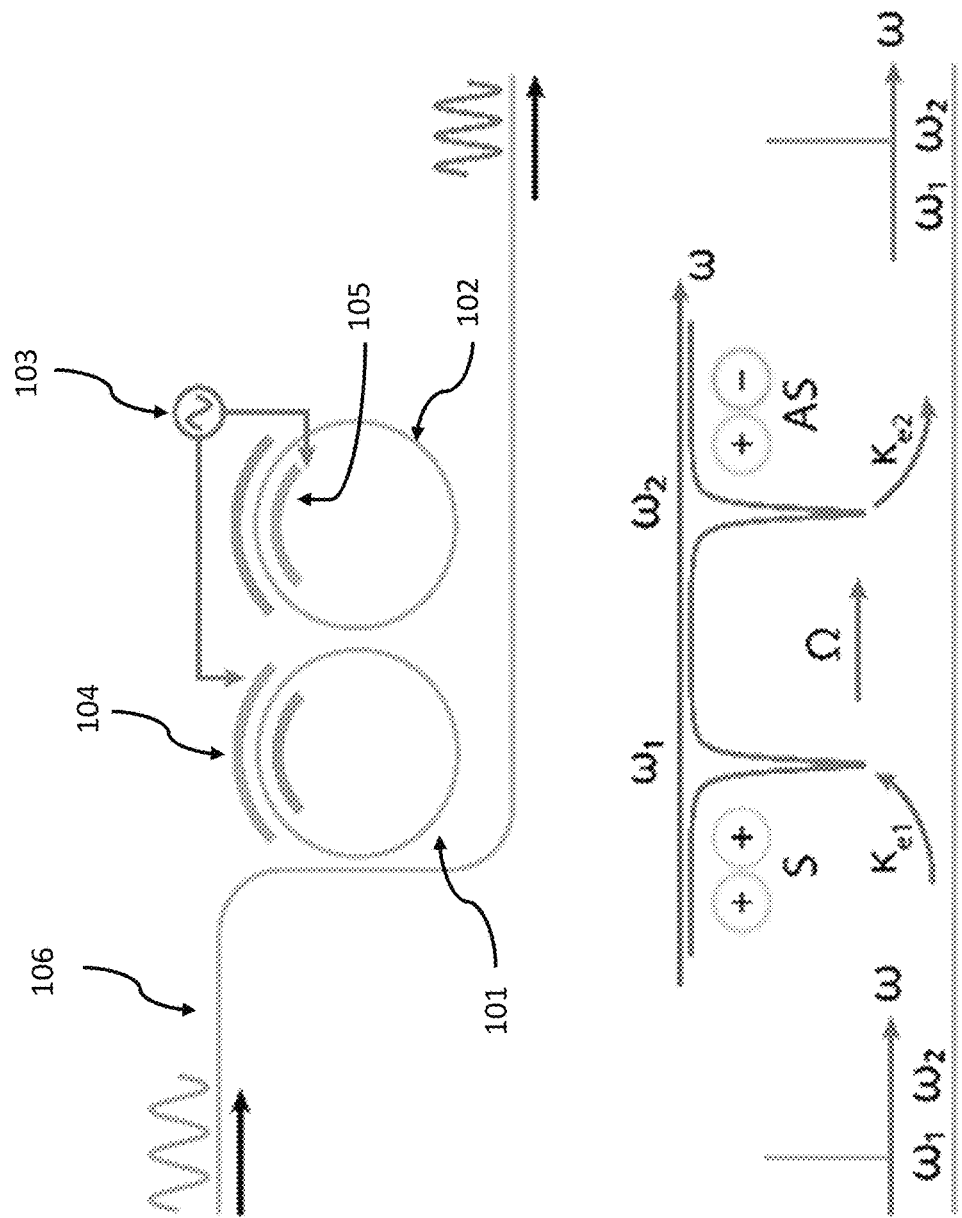
FIG. 1E is a schematic view of a frequency shifting device and its frequency-domain representation according to embodiments of the present disclosure.

To show that these device can perform up- and down-shifts simultaneously, information swapping between two different frequency channels is demonstrated using a single device, mimicking a 4-port coupler, as depicted in FIG. 1A. Such an operation allows the exchange of information between frequency channels without detection, which is of particular importance for modern telecommunications and quantum information processing. The measurement setup is shown in FIG. 3A. Two laser beams of frequency $\omega_1$ and $\omega_2$ are separately modulated to carry two different audio signals. The frequency difference between $\omega_1$ and $\omega_2$ is set to be 11 GHz, matching the doublet splitting of the device. The two laser beams are then combined and sent into frequency shifter device. At the output, a tunable filter is used to select each frequency channel and measure its time-domain audio signal using a photodetector followed by a real-time oscilloscope. FIG. 3B shows the measured audio signals before and after the swap operation, which exhibits little distortion owing to the near-unity shift efficiency.

Referring to FIG. 4, cascaded frequency shifting is illustrated. In FIG. 4A, balancing of coupling rates between several energy levels can permit unidirectional energy flow when $\kappa_{e1}=\Omega_1=\Omega_2=\ldots=\kappa_{e2}$. In FIG. 4B, an exemplary device structure to realize cascaded frequency shifting is provided. It consists of three coupled rings 401, 402, 403: ring 402 provides a set of equally detuned energy levels, with a mode coupling rate of $\Omega$ induced by microwave modulation; ring 401 over-couples modes 1 and 5 to the waveguide; and ring 403 induces a boundary to the cascade process by mode splitting. In this figure, the following variables are used—$\mu_1$: coupling rate between ring 401 and 402; $\mu_2$: coupling rate between ring 402 and 403. In FIG. 4C, simulated optical spectrum shows cascaded frequency shift when the generalized critical coupling condition is satisfied. A single microwave tone at 30 GHz (equal to the FSR of ring 402) generates a 5-mode cascaded frequency shift of 120 GHz with an insertion loss of 1.1 dB. The inset illustrates the energy flow in the coupled cavities system. $\omega_1$ in the x-axis is the frequency of mode 1 in the inset. In FIG. 4D, the shift can be scaled to a larger number of modes, with an incremental insertion loss of 0.15 dB per mode.

Figure 4A:
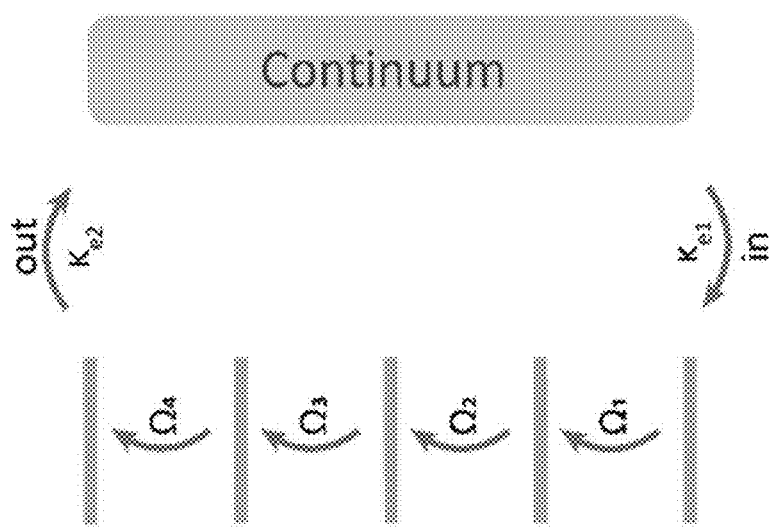
FIG. 4A is a schematic illustration of cascaded frequency shifting according to embodiments of the present disclosure.

As shown, devices of the present disclosure may be applied to shift optical frequencies beyond 100 GHz. However, by further increasing the evanescent coupling between the resonators (for larger doublet splitting) and by using high-frequency microwave amplifiers, this approach will ultimately be limited by the RC limit of the electrode and cost of high-speed microwave electronics. To mitigate this, in various embodiments a generalized cascaded shifter is provided by extending the scheme to a system consisting of multiple discrete levels coupled to a continuum (FIG. 4A). When coherent coupling applied between nearest-energy levels satisfies the generalized critical coupling condition $\kappa_{e1}=\Omega_1=\Omega_2=\ldots=\kappa_{e2}$, the energy can flow unidirectionally.

Figure 4B:
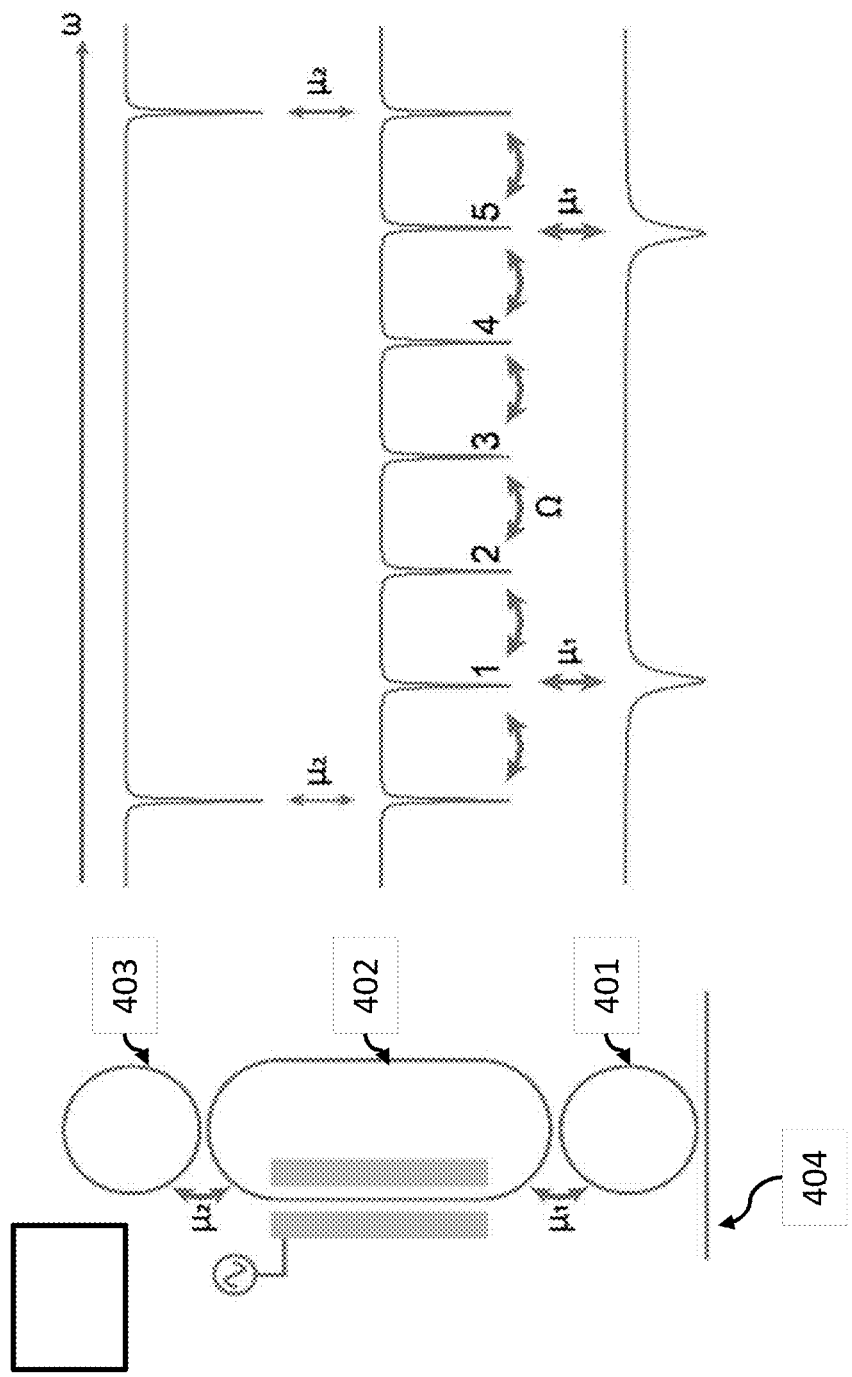
FIG. 4B is a schematic view of a three ring device and associated cascaded frequency shifting according to embodiments of the present disclosure.

As a result, a complete frequency shift can be achieved. FIG. 4B depicts an exemplary system for this process, comprising three resonators 401, 402, 403 and a single bus waveguide 404. A larger microresonator (ring 402) provides a family of discrete modes separated by the free spectral range (FSR, e.g., 30 GHz). Modulating this resonator at a frequency equal to the FSR provides coherent coupling between nearest-neighbor frequency modes. An over-coupled smaller microresonator (ring 401) with a large FSR (e.g., 120 GHz) is used to over-couple two modes (e.g., mode 1 and mode 5 in FIG. 4B) of ring 402 to the bus waveguide 404. Another microresonator (ring 403, FSR=180 GHz) induces mode crossing and thus breaks the cascade process in ring 402 since the modulation no longer couples the resultant doublet levels with their nearest-neighbor levels.

Figure 4C:
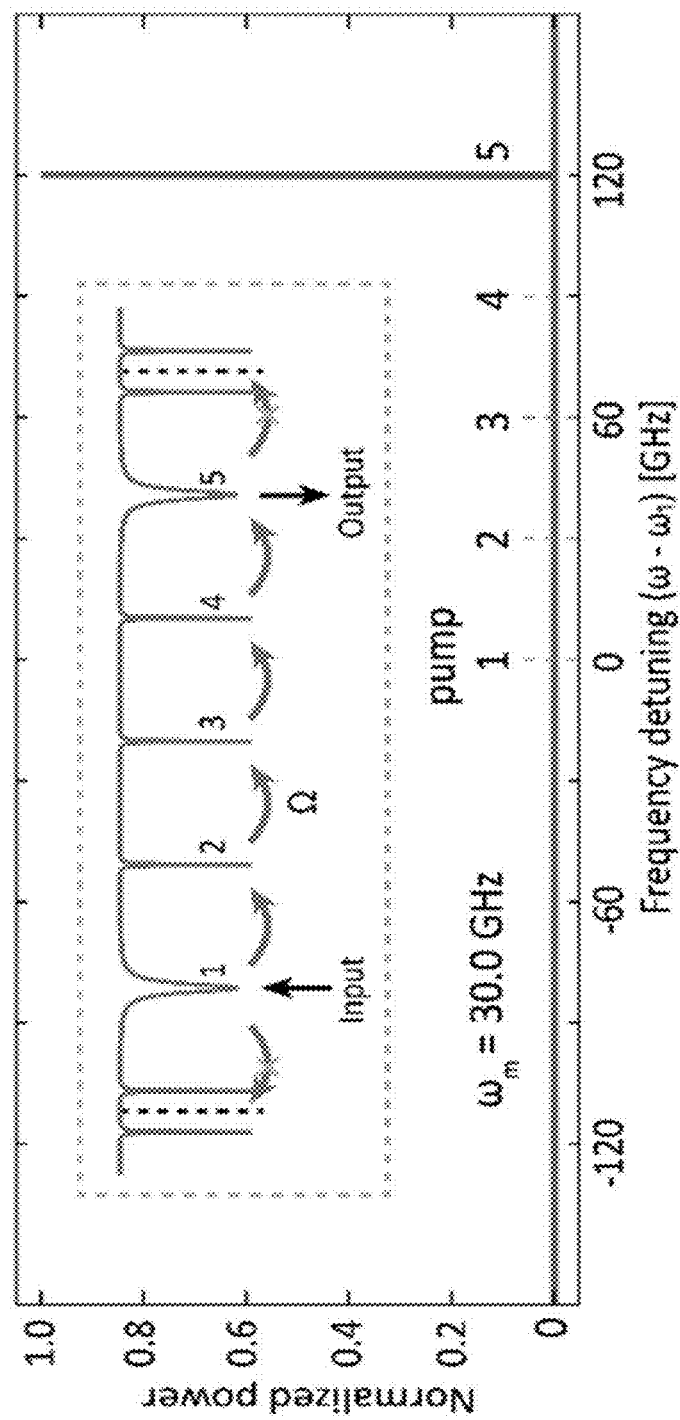
FIG. 4C is a plot of normalized power versus frequency detaining, illustrating a simulated optical spectrum according to embodiments of the present disclosure.
Figure 4D:
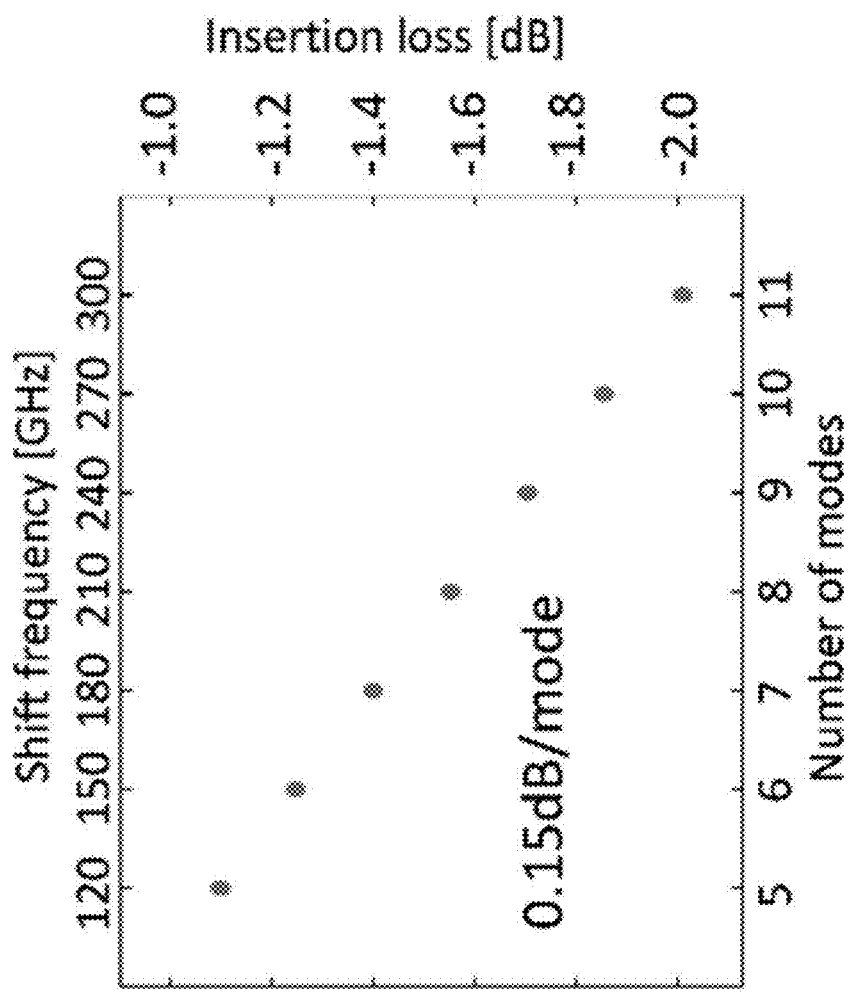
FIG. 4D is plot of shift frequency versus insertion loss according to embodiments of the present disclosure.

The inset of FIG. 4C illustrates the resonance spectrum of this device, which permits unidirectional energy flow under the generalized critical coupling condition. The main panel of FIG. 4C shows that the simulated shift efficiency can reach near-unity with a 1.1 dB insertion loss for a 120 GHz shift using a single 30 GHz microwave drive. Larger frequency shifts $(n-1)\omega_m$ can be realized by increasing the number of modes n without compromising the high shift efficiency, at a cost of an added insertion loss of 0.15 dB (simulated) per mode (FIG. 4D). Details of the simulations are provided in Methods, below.

As discussed above, the present disclosure provides efficient, low-loss, and reconfigurable electro-optic frequency shifters, enabled by integrated lithium niobate photonics. Improvements to the quality factor of the optical resonators and the use of a microwave cavity can further reduce the insertion loss and drive voltage required, respectively. For example, increasing optical intrinsic Q to $10^7$ will reduce the insertion loss to 0.04 dB, or can reduce both insertion loss and voltage to 0.2 dB and 1 V (see Methods). Dynamic control of the shifted light can be achieved by replacing the coupling gap with a microwave-driven Mach-Zehnder interferometer and by applying broadband microwave signals. Moreover, these methods for controlling the flow of light in the frequency domain can be applied to other systems, such as mechanics, superconducting qubits, quantum dots, or atomic systems which contain discretized and a continuum of energy levels. The ability to process information in the frequency domain in an efficient, compact, and scalable fashion reduces the resource requirements for linear-optical quantum computing and multiplexed quantum communication. Efficient and on-demand shifting of light also allows for control of the emission spectrum of solid-state single-photon emitters to create indistinguishable single photons or to produce deterministic single photons from probabilistic emitters. Reconfigurable frequency shifters as set out herein provide a building block for frequency-encoded information processing that offers benefits to telecommunications, radar, optical signal processing, spectroscopy, and laser control applications.

As set out above, the coherent coupling $\Omega$ between the two hybrid modes in a double ring system (e.g., of FIG. 1E) or between the adjacent modes of a central ring of a triple ring system (e.g., ring 402 in FIG. 4B) are both generated by performing phase modulation inside the cavities. The difference between the double ring case and the triple ring case is the modes that are coupled. In the double-ring system, coherent coupling $\Omega$ is created among two hybrid modes of the system. In the triple-ring system, coherent coupling $\Omega$ is between adjacent modes of the central ring (e.g., ring 402 in FIG. 4B).

In addition to the exemplary methods described above, coherent coupling $\Omega$ can be achieved by various additional methods. For example, all optical wave mixing may be employed. In such methods, through the optical $\chi_2$ or $\chi_3$ nonlinearity, different optical modes with different frequencies are coupled by wave-mixing processes, e.g., three-wave mixing and Bragg-scattering four-wave mixing.

In another example, acousto-optics is employed. Using phonon to scatter photon can create couplings between optical modes between two frequencies. In these approaches, light will absorb the frequency of phonon and generate new frequencies.

In another example, free carrier dispersion is employed. Like in silicon, one can use the free carrier effective to change the optical index of the material, creating effective phase modulation on cavity to induce coherent couplings.

In another example, the thermo-optic effect is employed. Temperature changes lead to a change of the optical index of the material, which can create effective phase modulation on cavity to induce coherent couplings.

Various exemplary embodiments described herein use lithium niobate for resonators and waveguides. However, it will be appreciated that a variety of electro-optic materials may be used in place of lithium niobate, such as lithium tantalate.

Various exemplary embodiments described herein rely on ring resonators. However, it will be appreciated that alternative resonator configurations may be substituted for one or more of the ring resonators in various embodiments. For example, various embodiments use circular rings, while various embodiments use racetrack rings.

In various embodiments, devices are fabricated on single crystalline thin-film lithium niobate (LN) device layer bonded onto a silicon (Si) handle wafers with a 2 µm thick thermally grown silicon dioxide layer on top. Electron-beam (e-beam) lithography is used to realize optical waveguide and microresonator patterns in hydrogen silsequioxane (HSQ) e-beam resist. The patterns is then transferred into the LN layer using argon plasma etching in a standard inductively couple plasma reactive ion etching (ICP-RIE) tool. The etched depth is 350 nm leaving a 250 nm LN slab behind. The slab allows for efficient electrical field penetration into the waveguide core region. The first layer of the gold interconnects is patterned using e-beam lithography and the metals are deposited with e-beam evaporation methods and lift-off processes. Next, a 1.6 µm silicon dioxide layer is deposited on top using plasma enhanced physical vapour deposition (PECVD) method. Finally, metal vias and the top metal layer are realized using photolithography followed by e-beam evaporation and lift-off processes.

As used herein, mode coupling refers to the transfer of energy between optical modes. Optical coupling refers to the transfer of EM waves between media.

In a first exemplary embodiment, an optical frequency shifter is provided. In a first aspect of the first exemplary embodiment, the optical frequency shifter comprises a continuous optical spectrum medium; a discrete optical spectrum medium optically coupled to the continuous optical spectrum medium; and a tunable element operably coupled to the discrete optical spectrum medium, wherein: the discrete optical spectrum medium has N optical modes (I:$\{i_1 \ldots i_N\}$), said optical modes being ordered and equidistant in a frequency domain, wherein N is an integer equal to or greater than 3, each of the optical modes ($i_n \in I$) having a coupling constant $\kappa_{e,n}$ with respect to the continuous optical spectrum medium, wherein at least one of the coupling constants $\kappa_{e,n}$ is different from the other coupling constants, the optical modes (I) having a coupling constant $\Omega$ with respect to one another, wherein the tunable element is configured to control the coupling constant $\Omega$.

As used herein, the set notation I:$\{i_1 \ldots i_N\}$ defines a set I of N modes, numbered $i_1 \ldots i_N$. Thus, an $n^{th}$ mode $i_n$ is contained in the set I. Likewise, a $j^{th}$ mode $i_j$ is also contained in the set I.

In a second aspect of the first exemplary embodiment, at least one optical mode ($i_j \in I$; $2 \leq j \leq N$) is uncoupled from its immediately preceding mode ($i_{j-1}$). Other features and example features of the system are as described above with respect to the first aspect of the first exemplary embodiment.

In a third aspect of the first exemplary embodiment, at least one optical mode ($i_k \in I$; $1 \leq k \leq N-1$) is uncoupled from its immediate succeeding mode ($i_{k+1}$). Other features and example features of the system are as described above with respect to the first through second aspects of the first exemplary embodiment.

In a fourth aspect of the first exemplary embodiment, the continuous spectrum optical spectrum medium is a waveguide and the discrete optical spectrum medium is a first optical resonator. Other features and example features of the system are as described above with respect to the first through third aspects of the first exemplary embodiment.

In a fifth aspect of the first exemplary embodiment, the discrete optical spectrum medium further comprises: a second optical resonator optically coupled to the waveguide, and, separately, optically coupled to the first optical resonator, the second resonator having a plurality of optical modes, wherein at least two of the plurality of optical modes of the second resonator each is coupled to an optical mode of the first optical resonator, so that not all optical modes (I) are coupled to the optical modes of the second resonator. Other features and example features of the system are as described above with respect to the fourth aspect of the first exemplary embodiment.

In a sixth aspect of the first exemplary embodiment, the discrete optical spectrum medium further comprises: a third optical resonator optically coupled to the first optical resonator, the third optical resonator having a plurality of optical modes, wherein at least two optical modes of the third optical resonator each is optically coupled to an optical mode of the first resonator, so that not all optical modes (I) are coupled to the optical modes of the third resonator. Other features and example features of the system are as described above with respect to the fifth aspect of the first exemplary embodiment.

In a seventh aspect of the first exemplary embodiment, the tunable element is a tunable microwave (MW) source, the MW source configured to generate a waveform signal having a MW frequency, the MW frequency being tunable within a frequency band that includes a difference between optical modes of the discrete optical spectrum medium in the frequency domain. Other features and example features of the system are as described above with respect to the third through sixth aspects of the first exemplary embodiment.

In an eighth aspect of the first exemplary embodiment, each of the second and the third optical resonators is a ring resonator; the first optical resonator is a racetrack resonator; and the optical frequency shifter further comprises a pair of electrodes disposed within the first resonator, wherein the tunable microwave source is electrically coupled to the pair of electrodes. Other features and example features of the system are as described above with respect to the seventh aspect of the first exemplary embodiment.

In a ninth aspect of the first exemplary embodiment, the racetrack resonator comprises an electro-optic material. Other features and example features of the system are as described above with respect to the eighth aspect of the first exemplary embodiment.

In a tenth aspect of the first exemplary embodiment, the electro-optic material is lithium niobate or lithium tantalate. Other features and example features of the system are as described above with respect to the ninth aspect of the first exemplary embodiment.

In a second exemplary embodiment, an optical frequency shifter is provided. In a first aspect of the second exemplary embodiment, the optical frequency shifter comprises: a waveguide; a first ring resonator optically coupled to the waveguide, the first ring resonator having a first plurality of optical modes; a racetrack resonator optically coupled to the first ring resonator, the racetrack resonator having N optical modes (I:$\{i_1 \ldots i_N\}$), said optical modes being ordered and equidistant in a frequency domain, wherein N is an integer equal to or greater than 3, wherein at least two optical modes of the second resonator each is coupled to an optical mode of the first optical resonator, so that not all optical modes (I) are coupled to the optical modes of the first ring resonator; a third ring resonator optically coupled to the racetrack resonator, the second ring resonator having a second plurality of optical modes, wherein at least two optical modes of the third resonator each is coupled to an optical mode of the racetrack resonator, so that so that not all optical modes (I) are coupled to the optical modes of the third ring resonator, and further wherein at least one optical mode ($i_j \in I$; $2 \leq j \leq N$) is uncoupled from its immediately preceding mode ($i_{j-1}$) and at least one optical mode ($i_k \in I$; $1 \leq k \leq N-1$) is uncoupled from its immediate succeeding mode ($i_{k+1}$); the optical frequency shifter further comprising: a tunable microwave (MW) source, the MW source configured to generate a waveform signal having a MW frequency, the MW frequency being tunable within a frequency band that includes a difference between the optical modes (I) in the frequency domain; a pair of electrodes disposed within the racetrack resonator, wherein the tunable MW source is electrically coupled to the pair of electrodes.

In a third exemplary embodiment, a method of shifting an optical frequency of a continuous wave is provided. In a first aspect of the third exemplary embodiment, the method comprises: receiving a continuous wave (CW) of a first optical frequency in a continuous optical spectrum medium; causing the CW of the first optical frequency to propagate from the continuous optical spectrum medium to a discrete optical spectrum medium, wherein: the discrete optical spectrum medium has N optical modes (I:$\{i_1 \ldots i_N\}$), said optical modes being ordered and equidistant in a frequency domain, wherein N is an integer equal to or greater than 3, each of the optical modes ($i_n \in I$) having a coupling constant $\kappa_{e,n}$ with respect to the continuous optical spectrum medium, wherein at least one of the coupling constants $\kappa_{e,n}$ is different from the other coupling constants, the optical modes (I) having a coupling constant $\Omega$ with respect to one another, modulating the coupling constant $\Omega$, thereby generating a CW of a second optical frequency; and causing the CW of the second optical frequency to propagate from the discrete optical spectrum medium into the continuous optical spectrum medium.

In a second aspect of the third exemplary embodiment, at least one optical mode ($i_j \in I$; $2 \leq j \leq N$) is uncoupled from its immediately preceding mode ($i_{j-1}$). Other features and example features of the system are as described above with respect to the first aspect of the third exemplary embodiment.

In a third aspect of the third exemplary embodiment, at least one optical mode ($i_k \in I$; $1 \leq k \leq N-1$) is uncoupled from its immediate succeeding mode ($i_{k+1}$). Other features and example features of the system are as described above with respect to the first through second aspects of the third exemplary embodiment.

In a fourth aspect of the third exemplary embodiment, the continuous spectrum optical spectrum medium is a waveguide and the discrete optical spectrum medium is a first optical resonator. Other features and example features of the system are as described above with respect to the first through third aspects of the third exemplary embodiment.

In a fifth aspect of the third exemplary embodiment, the discrete optical spectrum medium further comprises: a second optical resonator optically coupled to the waveguide, and, separately, optically coupled to the first optical resonator, the second resonator having a plurality of optical modes, wherein at least two of the plurality of optical modes of the second resonator each is coupled to an optical mode of the first optical resonator, so that not all optical modes (I) are coupled to the optical modes of the second resonator. Other features and example features of the system are as described above with respect to the fourth aspect of the third exemplary embodiment.

In a sixth aspect of the third exemplary embodiment, the discrete optical spectrum medium further comprises: a third optical resonator optically coupled to the first optical resonator, the third optical resonator having a plurality of optical modes, wherein at least two optical modes of the third optical resonator each is optically coupled to an optical mode of the first resonator, so that not all optical modes (I) are coupled to the optical modes of the third resonator. Other features and example features of the system are as described above with respect to the fifth aspect of the third exemplary embodiment.

In a seventh aspect of the third exemplary embodiment, the optical frequency shifter further comprises a tunable microwave (MW) source configured to cause a modulation of the coupling constant Ω, the method further comprising causing the MW source to generate a MW waveform signal having a MW frequency, the MW frequency being tunable within a frequency band that includes a difference between optical modes of the discrete optical spectrum medium in the frequency domain. Other features and example features of the system are as described above with respect to the third through sixth aspects of the third exemplary embodiment.

In an eighth aspect of the third exemplary embodiment, each of the second and the third optical resonators is a ring resonator; the first optical resonator is a racetrack resonator; and the optical frequency shifter further comprises a pair of electrodes disposed within the first resonator, wherein the tunable microwave source is electrically coupled to the pair of electrodes; and the method further comprising causing the MW waveform to drive the pair of electrode. Other features and example features of the system are as described above with respect to the seventh aspect of the third exemplary embodiment.

In a ninth aspect of the third exemplary embodiment, the racetrack resonator comprises an electro-optic material. Other features and example features of the system are as described above with respect to the eighth aspect of the third exemplary embodiment.

In a tenth aspect of the third exemplary embodiment, the electro-optic material is lithium niobate or lithium tantalate. Other features and example features of the system are as described above with respect to the ninth aspect of the third exemplary embodiment.

In a fourth exemplary embodiment, a method of shifting an optical frequency of a continuous wave is provided. In a first aspect of the fourth exemplary embodiment, the method comprises receiving a continuous wave (CW) of a first optical frequency in a waveguide; causing the CW of the first optical frequency to propagate from the waveguide to a first ring resonator optically coupled to the waveguide, the first ring resonator the first ring resonator having a first plurality of optical modes; causing the a racetrack resonator to be optically coupled to the first ring resonator, the racetrack resonator having N optical modes (I:$\{i_1 \ldots i_N\}$), said optical modes being ordered and equidistant in a frequency domain, wherein N is an integer equal to or greater than 3, and wherein at least two optical modes of the second resonator each is coupled to an optical mode of the first optical resonator, so that not all optical modes (I) are coupled to the optical modes of the first ring resonator; causing a third ring resonator to be optically coupled to the racetrack resonator, the second ring resonator having a second plurality of optical modes, wherein at least two optical modes of the third resonator each is coupled to an optical mode of the racetrack resonator, so that so that not all optical modes (I) are coupled to the optical modes of the third ring resonator, and further wherein at least one optical mode ($i_j \in I$; $2 \leq j \leq N$) is uncoupled from its immediately preceding mode ($i_{j-1}$) and at least one optical mode ($i_k \in I$; $1 \leq k \leq N-1$) is uncoupled from its immediate succeeding mode ($i_{k+i}$); causing a tunable microwave (MW) source to generate a MW waveform signal having a MW frequency, the MW frequency being tunable within a frequency band that includes a difference between the optical modes (I) in the frequency domain; the MW waveform signal driving pair of electrodes disposed within the racetrack resonator, wherein the tunable MW source is electrically coupled to the pair of electrodes; thereby generating a CW of a second optical frequency; and causing the CW of the second optical frequency to propagate from the first ring resonator into the waveguide.

Exemplary Methods

Figure 5A:
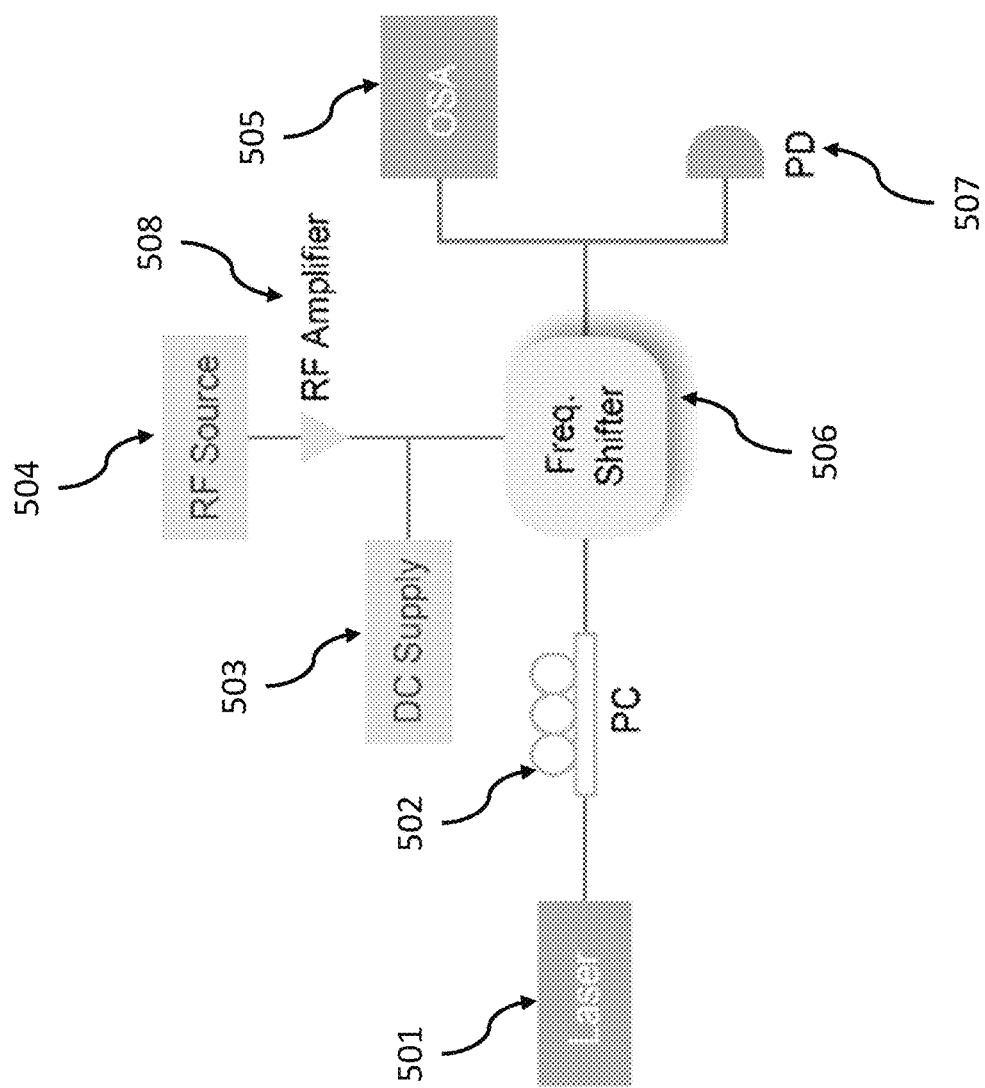
FIG. 5A is a schematic view of an exemplary system for frequency shift measurements according to embodiments of the present disclosure.
Figure 5B:
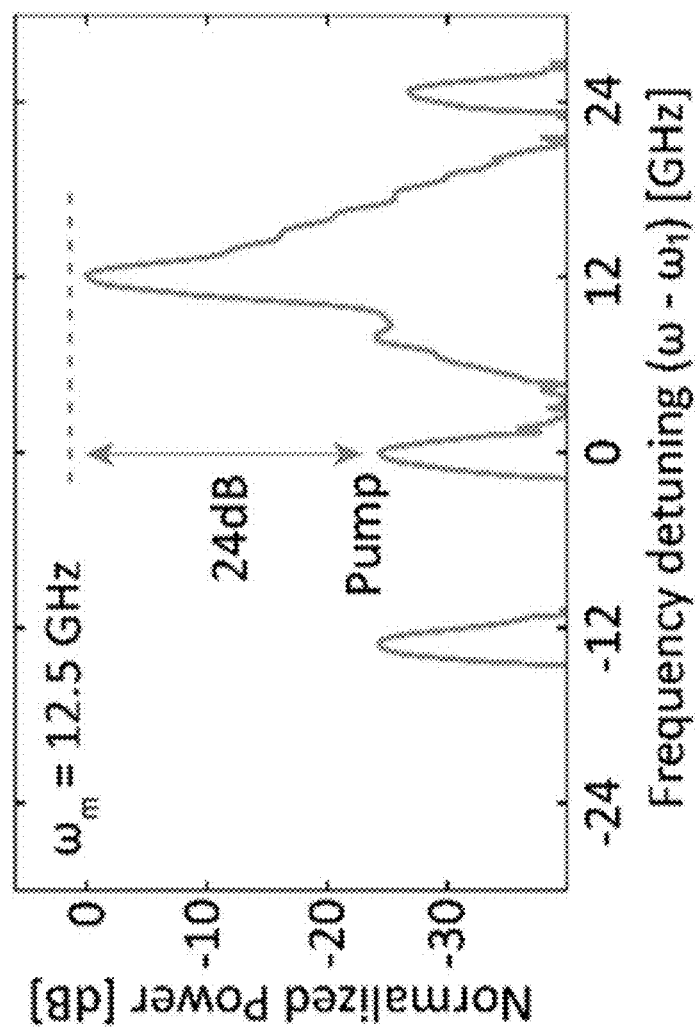
FIGS. 5B-C are plots of normalized power versus frequency detuning, illustrating spectral shifts according to embodiments of the present disclosure.
Figure 5C:
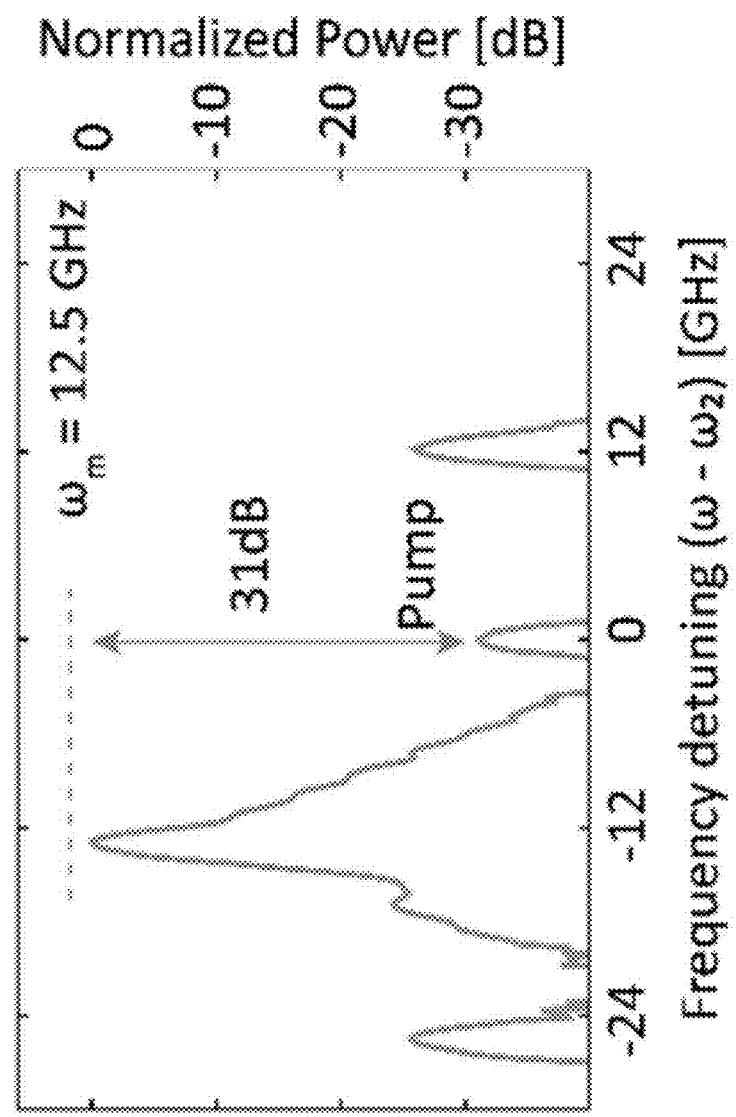

Referring to FIG. 5, the setup of frequency shift measurements and optical spectra is shown. In FIG. 5A, the set-up for measuring frequency up- and down-shifts is shown. In this figure, the following abbreviations are used—PC, polarization controller; OSA, optical spectrum analyzer; PD, photodetector. In FIG. 5B and FIG. 5C, the up- and down-shifts spectra in dB scale from a device with 12.5 GHz doublet splitting. Data corresponds to that in FIG. 2B and FIG. 2C, respectively, above.

Figure 6:
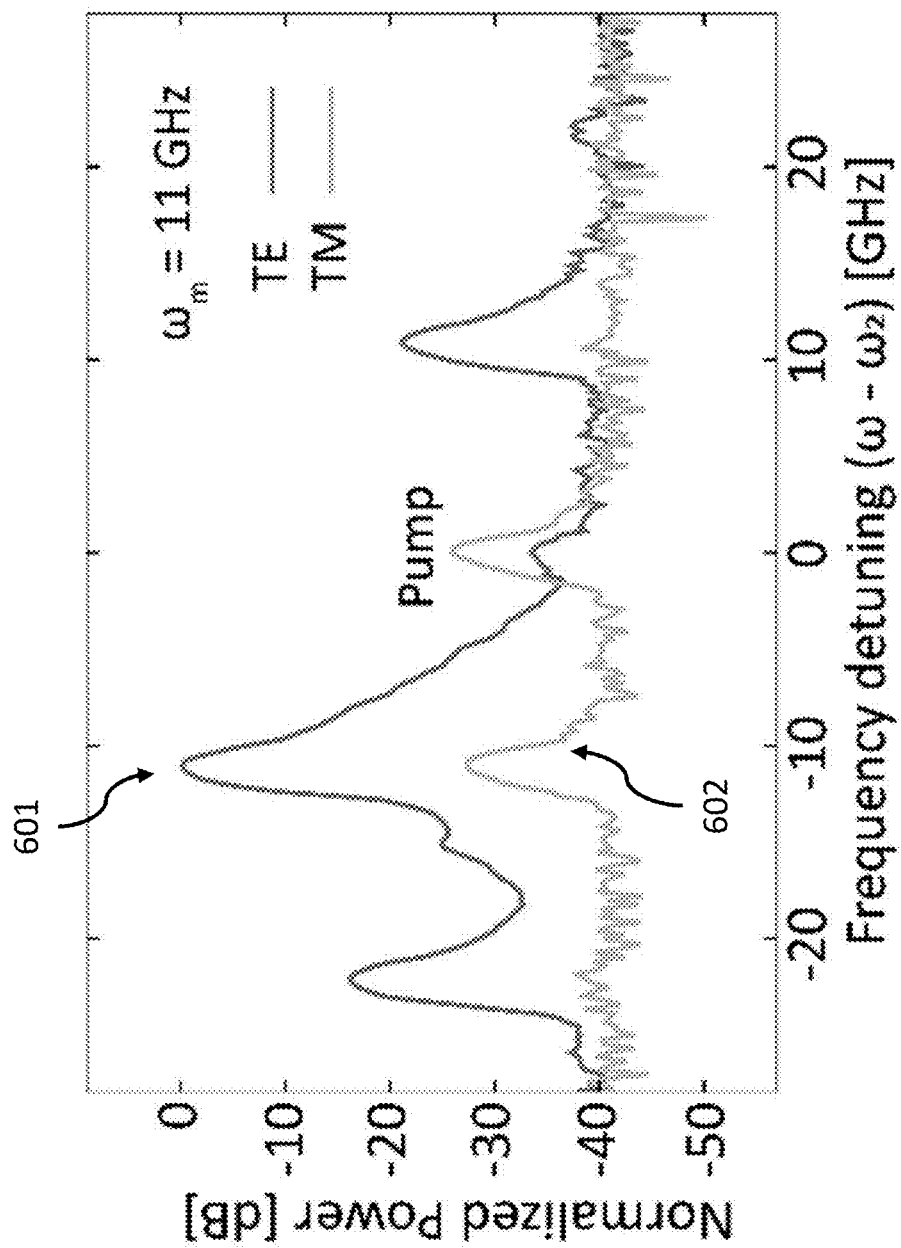
FIG. 6 is a plot of normalized power versus frequency detuning, illustrating polarization of frequency shifter output according to embodiments of the present disclosure.

Referring to FIG. 6, the polarization of the frequency shifter output is illustrated. This measurement is performed on a device with 11.0 GHz doublet splitting. The TE 601 and TM 602 components of the output light are measured using an optical spectrum analyzer after passing a polarizer. Here the power is normalized by the summation of TE and TM output powers.

Figure 7:
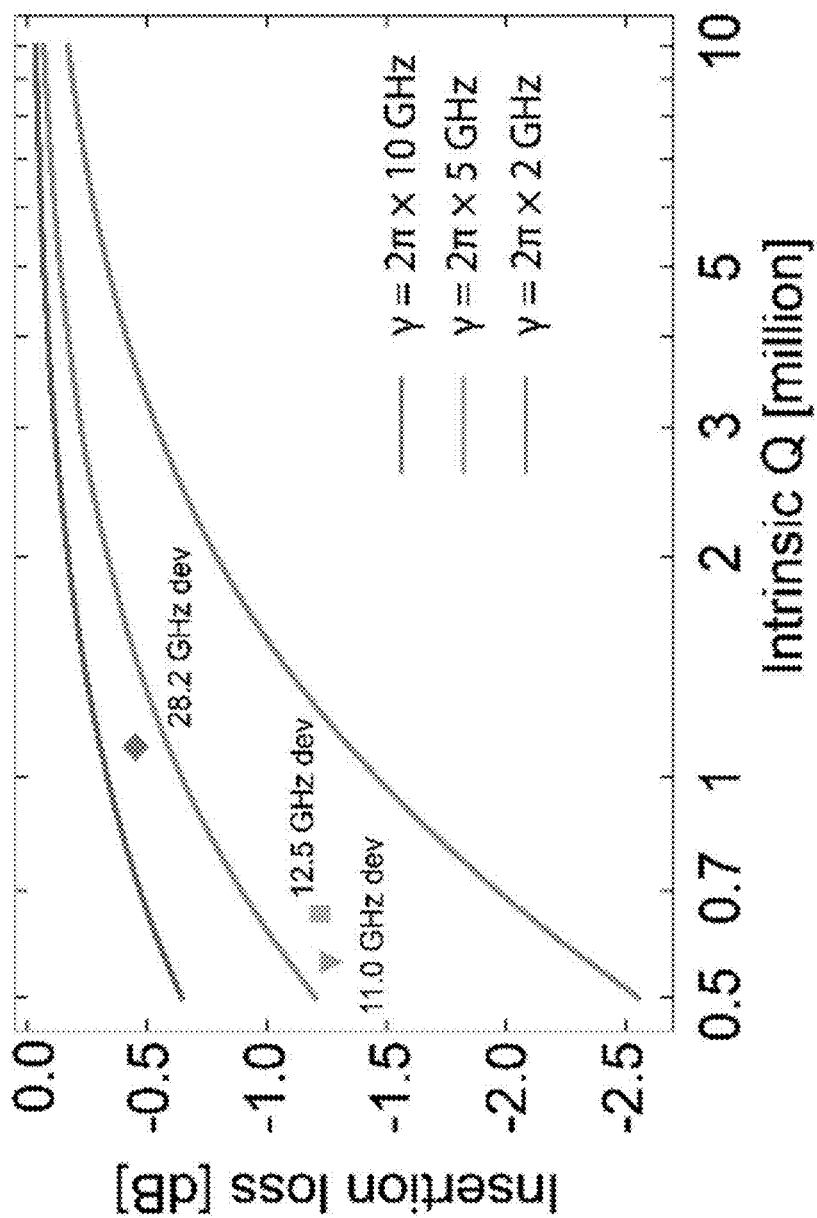
FIG. 7 is a plot of insertion loss versus intrinsic Q according to embodiments of the present disclosure.

Referring to FIG. 7, the ultimate limitation of the device insertion loss is shown. In this plot, the lines are stacked vertically in the same order as in the legend. Predicted device insertion loss is shown with varied $Q_{intrinsic}$ for different waveguide-ring couplings γ. The theoretical curve of insertion loss is calculated under the optimal condition of both pump and microwave detunings are zero. The measured insertion loss of the 11.0 GHz, 12.5 GHz, and 28.2 GHz devices used in this work are labeled with a triangle, square, and diamond, respectively.

Figure 8A:
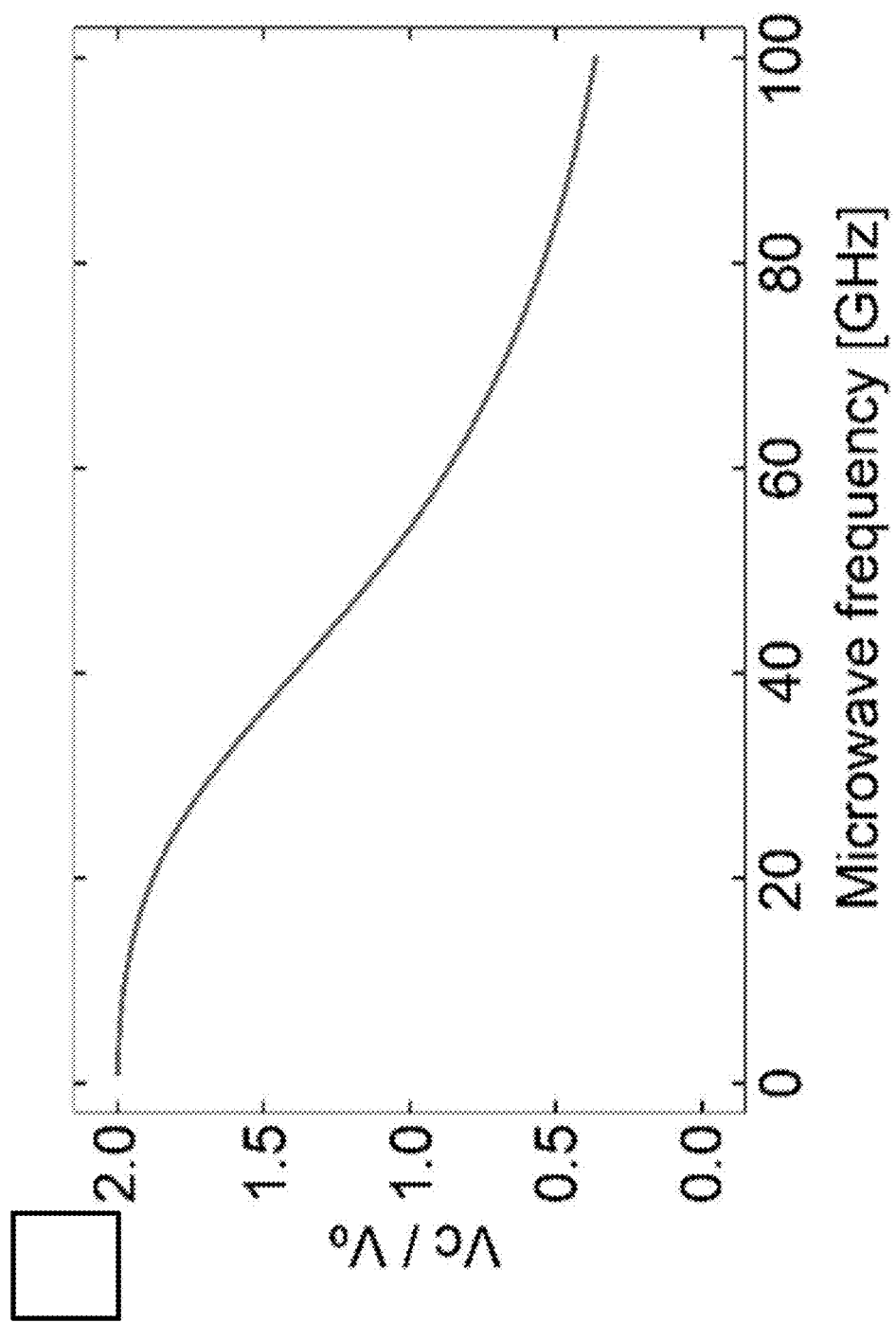
FIG. 8A is a plot of relative voltage versus microwave frequency, illustrating electrode performance according to embodiments of the present disclosure.
Figure 8B:
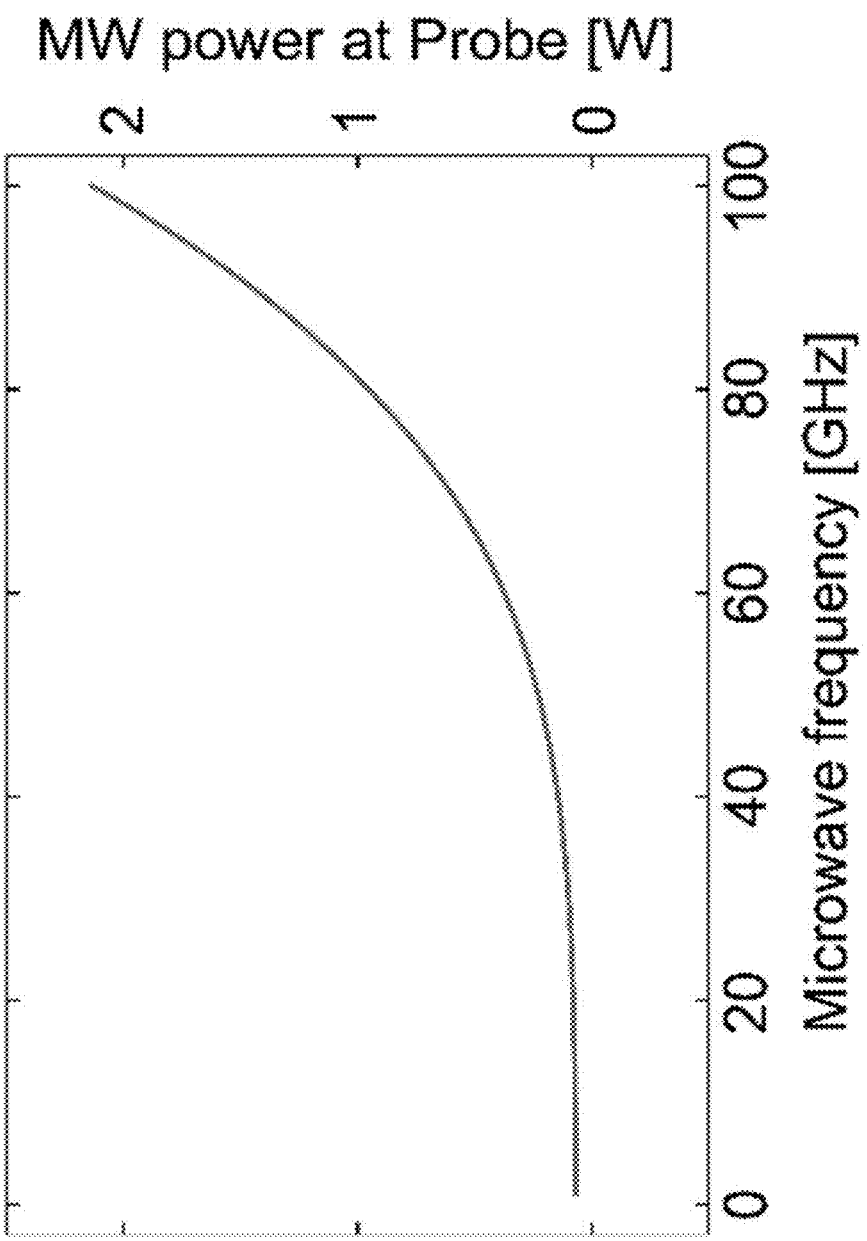
FIG. 8B is a plot of microwave power versus microwave frequency, illustrating power requirements according to embodiments of the present disclosure.

Referring to FIG. 8, the simulated electrode performance for varied microwave frequencies is illustrated. In FIG. 8A, the relative voltage delivered to the capacitor $V_c$ and probe $V_0$ for varied microwave frequencies is shown. In FIG. 8B, the power required at the probe (50Ω) for a maximal shift efficiency as a function of microwave frequency is shown. The exemplary 28.2 GHz device requires 96 mW microwave power (3.1 V microwave peak-voltage). It is assumed that the voltage $V_c$ delivered to the capacitor is kept same as the peak-voltage on capacitor ($V_c$=5.3 V) of the 28.2 GHz device when reaching 98.7% efficiency. MW, microwave.

Device fabrication. Devices are fabricated from a commercial x-cut lithium niobate (LN) on insulator wafer (NANOLN), with a 600 nm LN layer, 2 µm buried oxide (thermally grown), on a 500 µm Si handle. Electron-beam lithography followed by Ar$^+$-based reactive ion etching (350 nm etch depth) are used to pattern the optical layer of the device, including the rib waveguides and micro-ring resonators. Microwave electrodes (300 nm of Au) are defined by photolithography followed by electron-beam evaporation and a bilayer lift-off process. The devices are then cladded with 1.6 µm-thick $SiO_2$ using plasma-enhanced chemical evaporation deposition (PECVD). Vias are subsequently patterned using photolithography and etched through the oxide using hydrofluoric acid. Finally, another layer of metal (500 nm of Au) is patterned by photolithography, electron-beam evaporation and lift-off, to form crossovers that connect the bottom electrodes through the vias to ensure the desired polarities for microwave modulation.

Experimental characterization. The measurement setup is illustrated in the FIG. 5A. Telecommunication-wavelength light from a fiber-coupled tunable laser 501 (SANTEC TSL-510) passes through a polarization controller 502, and is coupled to the LN chip using a lensed fiber. The output is collimated using an aspheric lens and then sent to an optical spectrum analyzer (OSA) 505 with a spectral resolution of 0.02 nm for characterization of the frequency shift. The microwave signal is generated from a synthesizer 504 followed by a microwave amplifier 508. After passing through a circulator, the microwave signal is combined with a DC bias 503 through a bias-tee and delivered to the electrodes on the device 506 using an electrical probe. The DC signal tunes the optical resonances of both rings to achieve degenerate condition and form symmetric (S) and anti-symmetric (AS) hybrid modes. The frequency shifts for devices with 12.5 GHz, 11.0 GHz, and 28.2 GHz doublet splitting are measured at pump wavelengths of 1601.3 nm, 1631.5 nm, and 1633.2 nm, respectively. FIG. 5B and FIG. 5C correspond to the frequency shift shown in FIG. 2B and FIG. 2C, respectively, on a logarithmic vertical scale. The output spectrum consists of four frequency components: pump frequency, shifted frequency (anti-Stoke/Stoke line), shifted frequency of opposite sign (Stoke/anti-Stoke line), and second-order harmonic frequency.

The main source of error in estimating the shift efficiency η is the imperfect polarization control of the input light. The shifter is designed to operate using the transverse-electric (TE) mode. The control of the purity of the input polarization is limited by the 20 dB-30 dB extinction ratio of the polarization controller. In experiment, the polarization of the output light is verified on a device with 11.0 GHz doublet splitting and found the unshifted pump power is predominantly in the transverse-magnetic (TM) mode (see FIG. 6). Any TM input will mainly remain unshifted, leading to an underestimation of the optimal shift efficiency.

The experimental demonstration of the swap operation is performed at a wavelength of 1560.6 nm (setup shown in FIG. 3A). The frequency of two laser beams is first set to be far detuned from the doublet resonance and measure the time-domain audio signals as references. This corresponds to the case in which the signals are not swapped. The frequency of each laser beam is then tuned to be on resonance with one of the modes of the doublet, i.e., laser 301 (302) in S (AS) mode. In this case, frequency components around laser beam 301 are up-shifted and components around the frequency of laser beam 302 are down-shifted. The amplitudes of the time domain signal before and after swapping are renormalized for comparison in FIG. 3B.

Device parameters. The device parameters are characterized by sweeping the laser wavelength from 1580 nm to 1680 nm and measuring the transmission spectrum of the devices. Four parameters are extracted for each device: waveguide-cavity coupling γ, intrinsic loss rate $\kappa_i$ of the S and AS modes, linewidth $$\kappa = \frac{\gamma}{2} + \kappa_i$$

of the S and AS modes, and intrinsic quality factor $Q_{intrinsic}$ of the S and AS modes.

For the device with 12.5 GHz doublet splitting, γ=2π× 3.95 GHz, $\kappa_i$=2π×0.28 GHz, κ=2π×1.97 GHz, and $Q_{intrinsic}$ ~0.65×10$^6$ for the doublet at 1601.3 nm. For the 11.0 GHz device, the resonances at 1631.5 nm are selected and calculate γ=2π×4.98 GHz, $\kappa_i$=2π×0.33 GHz, κ=2π×2.82 GHz, and $Q_{intrinsic}$ ~0.56×10$^6$. For the 28.2 GHz shift device, the resonances at 1633.2 nm are analyzed, getting γ=2π×5.31 GHz, $\kappa_i$=2π×0.17 GHz, κ=2π×2.82 GHz, and $Q_{intrinsic}$~1.1×10$^6$.

Characterization and limitation of insertion loss. The insertion loss for the devices having doublet splitting of 12.5 GHz, 11.0 GHz, and 28.2 GHz are measured to be 1.22 dB, 1.25 dB, and 0.45 dB, respectively. The device insertion loss IL is defined to be the loss experienced by the light that travels through a device. Since the device is resonance-based, light will not go through the device if the laser is far detuned from resonance. Therefore, IL is determined by comparing the transmission when the laser is tuned on and far off resonance. The main source of error is the Fabry-Perot fringes that are induced by the two facets of the chip. These fringes produce a variation of the off-resonance transmission. This uncertainty is addressed by averaging multiple off-resonance power at different wavelengths.

To study the ultimate limit of the device insertion loss, IL is calculated as a function of $Q_{intrinsic}$ (FIG. 7) with different waveguide-ring coupling rates γ. Since the device operates in the strongly over-coupled regime (loaded quality factor $Q_{load}$~80,000 for S and AS modes), light only takes a few roundtrips inside the cavity with small propagation losses. As a result, the device insertion loss is close to that of a short bare waveguide. Thus increasing the ratio between waveguide-ring coupling rate γ and the intrinsic loss rate $\kappa_i$ can reduce the device insertion loss, as shown by FIG. 7. For example, increasing $Q_{intrinsic}$ to 10$^7$ will reduce the insertion loss to 0.04 dB for γ~2π×8.6 GHz.

Moreover, although decreasing γ leads to a larger insertion loss, the required voltage can be largely reduced. For example, for $Q_{intrinsic}$ ~10$^7$, reducing γ to 2π×3.5 GHz gives IL=0.1 dB and requires only 2 V microwave peak-voltage for a frequency shift of 28.2 GHz. Further reducing γ to 2π×1.7 GHz yields IL=0.2 dB and requires only 1 V microwave peak-voltage. The current device with a 28.2

GHz doublet splitting requires on-chip peak-voltage 3.1 V (see next section Ultimate limit of the magnitude of frequency shift).

Ultimate limit of the magnitude of frequency shift. This limit is due to the electrical circuit and not the optical components. Above, it was shown that the device efficiency and insertion loss are independent of the magnitude of frequency shift. To increase the magnitude of frequency shift, a smaller coupling gap between the two cavities can be used to increase doublet splitting. Since the cavity has a free spectral range of 250 GHz, it is not restricting the doublet splittings of the current device. Also, the intrinsic loss $\kappa_i$ and waveguide-ring coupling $\gamma$ can be maintained when the doublet splitting is increased. However, the electrode performance will degrade at high microwave frequencies. The current electrode is designed to be a capacitor to induce an electric field across the lithium niobate cavity. The impedance of the capacitor decreases with increasing microwave frequency. Thus, the circuit ultimately becomes a short load instead of an open load at high frequencies, and the voltage delivered to the device is reduced.

To quantitatively estimate this frequency limitation from the electrode, the electrode is simulated to obtain a 0.11 pF capacitance with a 0.12 nH inductance and 1.5Ω resistance. An LCR model is then used to calculate the voltage delivered to the capacitor. FIG. 8A shows the voltage $V_c$ on the capacitor divided by the voltage $V_0$ on the 50Ω input probe as a function of microwave frequency. For example, it is obtained that $V_c=1.72V_0$ at 28.2 GHz and $V_c=0.5V_0$ at 84.0 GHz, indicating a lower voltage delivery from the 50Ω input probe to the capacitor. To estimate the power required at high frequencies, the required coherent coupling strength is $\Omega \sim 2.65$ GHz to achieve the shift efficiency 98.7% using the device with 28.2 GHz doublet splitting. Combined with the electro-optic coefficient ($\sim 0.5$ GHz/V$^{27}$), this coherent coupling strength $\Omega$ corresponds to a required voltage of $V_c=5.3$ V on the capacitor and $V_0=3.1$ V on the 50Ω input probe. In FIG. 8B, plot the microwave input power that is needed from the probe is plotted as a function of frequency in order to maintain $V_c=5.3$ V. It can be seen that the required power becomes dramatically higher (>1 W) above ~84 GHz to compensate for the inefficient capacitive drive. To circumvent this problem, one could either design an electrode with lower capacitance or use a taper between the probe and the electrode which transforms the transmission line impedance to lower values and increases the effective RC frequency limit.

Numerical simulation. To numerically simulate the device, a system of phase-modulated coupled cavities is used to demonstrate an efficient frequency shift. The Hamiltonian of this system can be described as $$H = \omega_{ring1} a_1^\dagger a_1 + \omega_{ring2} a_2^\dagger a_2 + \mu(a_1^\dagger a_2 + a_1 a_2^\dagger) + \Omega \cos(\omega_m t + \varphi)(a_1^\dagger a_1 - a_2^\dagger a_2)$$

where $a_1$ and $a_2$ are the annihilation operators of the optical fields in cavities 1 and 2, while $\omega_{ring1}$ and $\omega_{ring2}$ are the corresponding cavity resonance frequencies, $\mu$ is the coupling strength between the two optical cavities due to the evanescent coupling, $\Omega$ is the modulation strength which is proportional to the microwave peak-voltage, $\omega_m$ is the microwave frequency, and $\varphi$ is the phase of the microwave signal. Here and henceforth $\hbar=1$. The minus sign in the last term is due to the modulation configuration of the system, in which the applied external voltage increases (decrease) the frequency of the resonance of ring 301 (302).

The equations of motion are based on the Heisenberg-Langevin equation derived from the Hamiltonian of the system. Accordingly, the equation of motion in the laser rotating frame is obtained:

$$\dot{a}_1 = \left(-i(\omega_{ring1} - \omega_L) - \frac{\gamma + \kappa_i}{2}\right)a_1 - i\Omega\cos(\omega_m t + \varphi)a_1 - i\mu a_2 - \sqrt{\gamma}a_{in}$$

$$\dot{a}_2 = \left(-i(\omega_{ring2} - \omega_L) - \frac{\kappa_i}{2}\right)a_2 - i\Omega\cos(\omega_m t + \varphi)a_2 - i\mu a_1$$

where $\gamma$ is the waveguide-ring coupling and $\kappa_i$ is the intrinsic loss of the ring. The amplitude of the input field is $$\alpha_{in} = \sqrt{\frac{P_{in}}{\omega_L}},$$

and the input pump power and frequency are $P_{in}$ and $\omega_L$, respectively. The simulation is performed by numerically solving these equations of motion to obtain the output field amplitude as $a_{out} = a_{in} + \sqrt{\gamma}a_1$. In the end, a Fourier transform is performed to analyze the frequency component of the output field.

Theoretical analysis. The above equations can be solved analytically using several transformations and approximations. The case is considered in which the two rings are identical, i.e., $\omega_{ring1} = \omega_{ring2} = \omega_0$. Then the Hamiltonian can be transformed to the basis of symmetric (S) mode $$c_1 = \frac{1}{\sqrt{2}}(a_1 + a_2)$$

and anti-symmetric (AS) mode $$c_2 = \frac{1}{\sqrt{2}}(a_1 - a_2).$$

In this basis, the Hamiltonian of the system transforms to $$H = \omega_1 c_1^\dagger c_1 + \omega_2 c_2^\dagger c_2 + \Omega \cos(\omega_m t + \varphi)(c_1^\dagger c_2 + h.c.)$$

where $\omega_1 = \omega_0 - \mu$ and $\omega_2 = \omega_0 + \mu$. As before, the equations of motion in the basic of $c_1$, $c_2$ can be derived from the Heisenberg-Langevin equations, yielding:

$$\dot{c}_1 = \left(-i\omega_1 - \frac{\kappa_1}{2}\right)c_1 - i\Omega\cos(\omega_m t + \varphi)c_2 - \sqrt{\kappa_{e_1}}\alpha_{in}e^{-i\omega_L t}$$

$$\dot{c}_2 = \left(-i\omega_2 - \frac{\kappa_2}{2}\right)c_2 - i\Omega\cos(\omega_m t + \varphi)c_1 - \sqrt{\kappa_{e_2}}\alpha_{in}e^{-i\omega_L t}$$

where $\kappa_{e_1}$ and $\kappa_{e_2}$ are the external loss rate to the waveguide for the S and AS modes, $\kappa_i$ is the intrinsic loss, $\kappa_j = \kappa_{e_j} + \kappa_i$ is the total linewidth of S (j=1) and AS (j=2) mode, $\omega_L$ and $\alpha_{in}$ is the frequency and amplitude of the input field. For the system $\kappa_{e1} = \kappa_{e2} = \gamma/2$ because the S and AS modes physically occupy both rings, while only ring 401 ($\alpha_1$) is coupled to the bus waveguide with a rate $\gamma$. For simplicity, it is assumed that $\kappa_e \equiv \kappa_{e1} = \kappa_{e2}$ and $\kappa \equiv \kappa_1 = \kappa_2$.

With the symmetric mode being pumped, the modes $c_1$, $c_2$ can be replaced by their slowly varying amplitudes as $c_1 \to c_1 e^{-i\omega_L t}$, $c_2 \to c_2 e^{-i\omega_L t - i\omega_m t}$. Under the rotating wave approximation, the equations of motion become $$\dot{c}_1 = \left(i\Delta - \frac{\kappa}{2}\right)c_1 - i\frac{\Omega}{2}e^{i\phi}c_2 - \sqrt{\kappa_e}\,\alpha_{in}$$

$$\dot{c}_2 = \left(i\Delta + i\delta - \frac{\kappa}{2}\right)c_2 - i\frac{\Omega}{2}e^{-i\phi}c_1 - \sqrt{\kappa_e}\,\alpha_{in}e^{i\omega_m t}$$

where $\Delta = \omega_L - \omega_1$ is the laser detuning with respect to the S mode and $\delta = \omega_m - 2\mu$ is the detuning of microwave field with respect to the S-AS doublet splitting. Using the fact that $c_2$ is off resonantly pumped, the pump term in the equation of motion of $c_2$ can be neglected, and the steady-state solution can be obtained (for simplicity $\varphi = 0$):

$$c_1 = \frac{\sqrt{\kappa_e}\,\alpha_{in}}{i\Delta - \frac{\kappa}{2} + \frac{\Omega^2/4}{i\Delta + i\delta - \frac{\kappa}{2}}}$$

$$c_2 = i\frac{\Omega}{2}\frac{\sqrt{\kappa_e}\,\alpha_{in}}{\left(i\Delta - \frac{\kappa}{2}\right)\left(i\Delta + i\delta - \frac{\kappa}{2}\right) + \frac{\Omega^2}{4}}$$

The output field will then be $$a_{out} = \alpha_{in}e^{-i\omega_L t} + \sqrt{\kappa_e}(c_1 e^{-i\omega_L t} + c_2 e^{-i\omega_L t}e^{-i\omega_m t})$$

The output field can be rewritten as two different frequency components $a_{out} = A_0 e^{-i\omega_L t} + A_+ e^{-i\omega_L t}e^{-i\omega_m t}$ with $A_0 = \alpha_{in} + \sqrt{\kappa_e}c_1$ and $A_+ = \sqrt{\kappa_e}c_2$. For the case of zero optical and microwave detuning ($\Delta=0$ and $\delta=0$), the pump component $A_0$ becomes $$\alpha_{in}\left(1 + \frac{\kappa_e}{-\frac{\kappa}{2} + \frac{\Omega^2}{\frac{K}{2}}}\right),$$

which indicates that the coherent coupling $\Omega$ introduces an effective intrinsic loss channel for mode $c_1$ as expected. The total loss for mode $c_1$ can be written as $\kappa_{1_{eff}} =$ $$\kappa\left(1 + \left(\frac{\Omega}{K}\right)^2\right),$$

where the factor $\Omega^2/\kappa^2$ is the loss rate that is induced by coupling to another mode and plays a similar role as the Purcell effect in cavity quantum electrodynamics. This effective loss balances the large external loss channel ($\kappa_e$) to the waveguide and leads to the complete suppression of the pump. Considering the case $\kappa_e \gg \kappa_i$, a condition is obtained for generating a unidirectional frequency shift: $\kappa_e = \Omega^2/\kappa_e$, which means $\Omega = \kappa_e$ when the intrinsic loss is negligible (as is the case for the exemplary device).

The concept of balancing the coupling rates can be intuitively understood using impedance matching. For example, when an optical cavity with an intrinsic loss rate $\kappa_i$ is coupled to a waveguide with a coupling strength $\kappa_e$, some of the light is coupled back to the waveguide. This is identical to the microwave reflection coefficient in transmission-line theory with effective reflection coefficient $$\Gamma = \frac{\kappa_i - \kappa_e}{\kappa_i + \kappa_e}.$$

In this picture, the case of strong under-coupling ($\kappa_i \gg \kappa_e$) and over-coupling ($\kappa_i \ll \kappa_e$) between a waveguide and a cavity corresponds to open and short circuits, respectively. This interpretation helps to understand the cascaded frequency shifting scheme that is discussed in FIG. 4 above, in which photons propagate through a ladder of energy levels without reflection to realize unidirectional frequency shifts of >100 GHz.

Moreover, the current microwave bandwidth of the device is at least 3 GHz, benefitting from the strong over-coupling of the S and AS modes (linewidths $\sim 2\pi \times 2.8$ GHz) to the waveguide. The microwave frequency can exceed the linewidth of the S and AS modes due to the power broadening of the modes by the strong coherent coupling $\Omega$. This effect could be understood by considering the total loss rate $$\kappa_{1_{eff}} = \kappa\left(1 + \left(\frac{\Omega}{K}\right)^2\right)$$

of mode $c_1$, in which the strong $\Omega$ leads to a larger loss rate of $c_1$ thus a broader effective linewidth. A similar analysis can be performed on the AS mode $c_2$.

Unitary transformation of the frequency beam splitter. Here it is shown that the frequency beam splitter acts on discrete frequency modes according to the same unitary transformation that a beam splitter obeys when acting on spatial modes (paths). Considering the case where $\kappa_i \to 0$, i.e. that with vanishing insertion loss, pumping of the S mode with $\Delta=0$ and $\delta=0$ gives $$A_0 = \frac{\Omega^2 - \kappa_e^2}{\Omega^2 + \kappa_e^2}$$

$$A_+ = ie^{-i\varphi}\frac{2\Omega\kappa_e}{\Omega^2 + \kappa_e^2}$$

where $A_0$ and $A_+$ are the two frequency components of the output field $a_{out} = A_0 e^{-i\omega_L t} + A_+ e^{-i\omega_L t}e^{-i\omega_m t}$ that are discussed before and are normalized by the input field $\alpha_{in}$, alternatively $\alpha_{in}=1$. Based on this result, $A_0 = \cos\theta$ and $A_+ = ie^{-i\varphi}\sin\theta$ with $\theta = \theta(\Omega)$. Similar results in the case of pumping the AS mode can be obtained. Finally, the operator of the frequency splitter is expressed as:

$$U = \begin{pmatrix} \cos\theta(\Omega) & ie^{-i\varphi}\sin\theta(\Omega) \\ ie^{i\varphi}\sin\theta(\Omega) & \cos\theta(\Omega) \end{pmatrix}$$

where the splitting ratio is controlled by $\Omega$, which is governed by the microwave power, while the phase is tuned by the microwave phase $\varphi$. The EO device is coherent and does not change other degrees of freedom (e.g., polarization or spatial modes) or introduce noise photons from the microwave drive, which is of importance for quantum optics and information tasks (e.g., quantum communication and computing).

Simulation of cascaded frequency shift. The numerical simulation is performed based on the equations of motion for the system of cascaded frequency shift derived by a similar approach (Heisenberg-Langevin equation) that are discussed above. In the simulation, it is assumed that all three cavities to have an intrinsic Q~$1.8\times10^6$, which corresponds to an intrinsic loss rate $\kappa_i=2\pi\times100$ MHz. The waveguide-mode coupling of ring 1 is $\kappa_e=2\pi\times3$ GHz, the ring 1-ring 2 evanescent coupling is $\mu_1=2\pi\times1.5$ GHz, and the ring 2-ring 3 coupling is $\mu_2=2\pi\times3$ GHz. The coupling induced by microwave modulation is $\Omega=2\pi\times3$ GHz, which is similar to the value used in the exemplary devices.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An optical frequency shifter, comprising:
   a continuous optical spectrum medium;
   a discrete optical spectrum medium optically coupled to the continuous optical spectrum medium; and
   a tunable element operably coupled to the discrete optical spectrum medium, wherein:
   the discrete optical spectrum medium has N optical modes (I:$\{i_1 \ldots i_N\}$), said optical modes being ordered and equidistant in a frequency domain, wherein N is an integer equal to or greater than 3,
   each of the optical modes ($i_n \in I$) having a coupling constant $\kappa_{e,n}$ with respect to the continuous optical spectrum medium, wherein at least one of the coupling constants $\kappa_{e,n}$ is different from the other coupling constants,
   the optical modes (I) having a coupling constant $\Omega$ with respect to one another, wherein the tunable element is configured to control the coupling constant $\Omega$.

2. The optical frequency shifter of claim 1, wherein:
   at least one optical mode ($i_j \in I$; $2 \leq j \leq N$) is uncoupled from its immediately preceding mode ($i_{j-1}$).

3. The optical frequency shifter of claim 1, wherein:
   at least one optical mode ($i_k \in I$; $1 \leq k \leq N-1$) is uncoupled from its immediate succeeding mode ($i_{k+1}$).

4. The optical frequency shifter of claim 1, wherein the continuous spectrum optical spectrum medium is a waveguide and the discrete optical spectrum medium comprises a first optical resonator.

5. The optical frequency shifter of claim 4, wherein the discrete optical spectrum medium further comprises:
   a second optical resonator optically coupled to the waveguide, and, separately, optically coupled to the first optical resonator, the second optical resonator having a plurality of optical modes, wherein at least two of the plurality of optical modes of the second optical resonator each is coupled to an optical mode of the first optical resonator, so that not all optical modes (I) are coupled to the optical modes of the second optical resonator.

6. The optical frequency shifter of claim 5, wherein the discrete optical spectrum medium further comprises:
   a third optical resonator optically coupled to the first optical resonator, the third optical resonator having a plurality of optical modes, wherein at least two optical modes of the third optical resonator each is optically coupled to an optical mode of the first optical resonator, so that not all optical modes (I) are coupled to the optical modes of the third optical resonator.

7. The optical frequency shifter of claim 6, wherein the tunable element is a tunable microwave (MW) source, the MW source configured to generate a waveform signal having a MW frequency, the MW frequency being tunable within a frequency band that includes a difference between optical modes of the discrete optical spectrum medium in the frequency domain.

8. The optical frequency shifter of claim 7, wherein:
   each of the second and the third optical resonators is a ring resonator;
   the first optical resonator is a racetrack resonator; and
   the optical frequency shifter further comprises
   a pair of electrodes disposed within the first optical resonator, wherein the tunable microwave source is electrically coupled to the pair of electrodes.

9. The optical frequency shifter of claim 8, wherein the racetrack resonator comprises an electro-optic material.

10. The optical frequency shifter of claim 9, wherein the electro-optic material is lithium niobate or lithium tantalate.

11. An optical frequency shifter, comprising:
    a waveguide;
    a first ring resonator optically coupled to the waveguide, the first ring resonator having a first plurality of optical modes;
    a racetrack resonator optically coupled to the first ring resonator, the racetrack resonator having N optical modes (I:$\{i_1 \ldots i_N\}$), said optical modes being ordered and equidistant in a frequency domain, wherein N is an integer equal to or greater than 3,
    wherein at least two optical modes of the racetrack resonator each is coupled to an optical mode of the first ring resonator, so that not all optical modes (I) are coupled to the optical modes of the first ring resonator;
    a second ring resonator optically coupled to the racetrack resonator, the second ring resonator having a second plurality of optical modes, wherein at least two optical modes of the second ring resonator each is coupled to an optical mode of the racetrack resonator, so that so that not all optical modes (I) are coupled to the optical modes of the second ring resonator, and further wherein
    at least one optical mode ($i_j \in I$; $2 \leq j \leq N$) is uncoupled from its immediately preceding mode ($i_{j-1}$) and
    at least one optical mode ($i_k \in I$; $1 \leq k \leq N-1$) is uncoupled from its immediate succeeding mode ($i_{k+i}$);
    the optical frequency shifter further comprising:
    a tunable microwave (MW) source, the MW source configured to generate a waveform signal having a MW frequency, the MW frequency being tunable within a frequency band that includes a difference between the optical modes (I) in the frequency domain;
    a pair of electrodes disposed within the racetrack resonator, wherein the tunable MW source is electrically coupled to the pair of electrodes.

12. A method of shifting an optical frequency of a continuous wave, comprising:
    receiving a continuous wave (CW) of a first optical frequency in a continuous optical spectrum medium;

causing the CW of the first optical frequency to propagate from the continuous optical spectrum medium to a discrete optical spectrum medium, wherein:
the discrete optical spectrum medium has N optical modes (I: $\{i_1 \ldots i_N\}$), said optical modes being ordered and equidistant in a frequency domain, wherein N is an integer equal to or greater than 3,
each of the optical modes ($i_n \in I$) having a coupling constant $\kappa_{e,n}$ with respect to the continuous optical spectrum medium, wherein at least one of the coupling constants $\kappa_{e,n}$ is different from the other coupling constants,
the optical modes (I) having a coupling constant $\Omega$ with respect to one another,
modulating the coupling constant $\Omega$, thereby generating a CW of a second optical frequency; and
causing the CW of the second optical frequency to propagate from the discrete optical spectrum medium into the continuous optical spectrum medium.

13. The method of claim 12, wherein:
at least one optical mode ($i_j \in I$; $2 \le j \le N$) is uncoupled from its immediately preceding mode ($i_{j-1}$).

14. The method of claim 12, wherein:
at least one optical mode ($i_k \in I$; $1 \le k \le N-1$) is uncoupled from its immediate succeeding mode ($i_{k+1}$).

15. The method of claim 12, wherein the continuous spectrum optical spectrum medium is a waveguide and the discrete optical spectrum medium comprises a first optical resonator.

16. The method of claim 15, wherein the discrete optical spectrum medium further comprises:
a second optical resonator optically coupled to the waveguide, and, separately, optically coupled to the first optical resonator, the second optical resonator having a plurality of optical modes, wherein at least two of the plurality of optical modes of the second optical resonator each is coupled to an optical mode of the first optical resonator, so that not all optical modes (I) are coupled to the optical modes of the second optical resonator.

17. The method of claim 16, wherein the discrete optical spectrum medium further comprises:
a third optical resonator optically coupled to the first optical resonator, the third optical resonator having a plurality of optical modes, wherein at least two optical modes of the third optical resonator each is optically coupled to an optical mode of the first optical resonator, so that not all optical modes (I) are coupled to the optical modes of the third optical resonator.

18. The method of claim 17, wherein the optical frequency shifter further comprises a tunable microwave (MW) source configured to cause a modulation of the coupling constant $\Omega$,
the method further comprising causing the MW source to generate a MW waveform signal having a MW frequency, the MW frequency being tunable within a frequency band that includes a difference between optical modes of the discrete optical spectrum medium in the frequency domain.

19. The method of claim 18, wherein:
each of the second and the third optical resonators is a ring resonator;
the first optical resonator is a racetrack resonator; and
the optical frequency shifter further comprises
a pair of electrodes disposed within the first optical resonator, wherein the tunable microwave source is electrically coupled to the pair of electrodes; and
the method further comprising causing the MW waveform to drive the pair of electrodes.

20. The method of claim 19, wherein the racetrack resonator comprises an electro-optic material.

21. The method of claim 20, wherein the electro-optic material is lithium niobate or lithium tantalate.

22. A method of shifting an optical frequency of a continuous wave, comprising:
receiving a continuous wave (CW) of a first optical frequency in a waveguide;
causing the CW of the first optical frequency to propagate from the waveguide to a first ring resonator optically coupled to the waveguide, the first ring resonator having a first plurality of optical modes;
causing a racetrack resonator to be optically coupled to the first ring resonator, the racetrack resonator having N optical modes (I: $\{i_1 \ldots i_N\}$), said optical modes being ordered and equidistant in a frequency domain, wherein N is an integer equal to or greater than 3, and
wherein at least two optical modes of the racetrack resonator each is coupled to an optical mode of the first ring resonator, so that not all optical modes (I) are coupled to the optical modes of the first ring resonator;
causing a second ring resonator to be optically coupled to the racetrack resonator, the second ring resonator having a second plurality of optical modes, wherein at least two optical modes of the second ring resonator each is coupled to an optical mode of the racetrack resonator, so that so that not all optical modes (I) are coupled to the optical modes of the second ring resonator, and further wherein
at least one optical mode ($i_j \in I$; $2 \le j \le N$) is uncoupled from its immediately preceding mode ($i_{j-1}$) and
at least one optical mode ($i_k \in I$; $1 \le k \le N-1$) is uncoupled from its immediate succeeding mode ($i_{k+1}$);
causing a tunable microwave (MW) source to generate a MW waveform signal having a MW frequency, the MW frequency being tunable within a frequency band that includes a difference between the optical modes (I) in the frequency domain;
the MW waveform signal driving pair of electrodes disposed within the racetrack resonator, wherein the tunable MW source is electrically coupled to the pair of electrodes;
thereby generating a CW of a second optical frequency; and
causing the CW of the second optical frequency to propagate from the first ring resonator into the waveguide.

* * * * *